United States Patent
da Silva et al.

(10) Patent No.: US 12,543,079 B2
(45) Date of Patent: *Feb. 3, 2026

(54) HANDLING OF INACTIVE/IDLE MEASUREMENT CONFIGURATIONS AND INACTIVE/IDLE MEASUREMENTS UPON INTER-RAT CELL RESELECTION

(71) Applicant: Telefonaktiebolaget LM Ericsson (PUBL), Stockholm (SE)

(72) Inventors: Icaro L.J. da Silva, Solna (SE); Patrik Rugeland, Stockholm (SE); Oumer Teyeb, Montréal (CA); Jens Bergqvist, Linköping (SE); Pradeepa Ramachandra, Linköping (SE)

(73) Assignee: Telefonaktiebolaget LM Ericsson (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 18/487,198

(22) Filed: Oct. 16, 2023

(65) Prior Publication Data

US 2024/0056909 A1 Feb. 15, 2024

Related U.S. Application Data

(63) Continuation of application No. 17/598,255, filed as application No. PCT/SE2020/050105 on Feb. 5, 2020, now Pat. No. 11,792,698.

(Continued)

(51) Int. Cl.
*H04W 36/00* (2009.01)
*H04W 76/30* (2018.01)
(52) U.S. Cl.
CPC ....... *H04W 36/0058* (2018.08); *H04W 76/30* (2018.02)

(58) Field of Classification Search
CPC . H04W 36/0058; H04W 76/30; H04W 36/08; H04W 36/14
See application file for complete search history.

(56) References Cited

U.S. PATENT DOCUMENTS 11,792,698 B2 * 10/2023 da Silva ............... H04W 24/10
370/331
2017/0208521 A1 7/2017 Wu et al.
(Continued)

OTHER PUBLICATIONS

3GPP TS 36.304 v15.2.0; Technical Specification; 3rd Generation Partnership Project; Technical Specification Group Radio Access Network; Evolved Universal Terrestrial Radio Access (E-UTRA); User Equipment (UE) procedures in idle mode (Release 15)—Dec. 2018.

(Continued)

*Primary Examiner* — Justin Y Lee
(74) *Attorney, Agent, or Firm* — Baker Botts L.L.P.

(57) ABSTRACT

Systems and methods are disclosed herein that relate to handling of dormant state measurement configurations and associated measurements upon inter-Radio Access Technology (RAT) cell reselection. In some embodiments, a method performed by a wireless device comprises receiving one or more dormant state measurement configurations from a network node of a source RAT, performing measurements while in a dormant state in accordance with at least one of the one or more dormant state measurement configurations, and performing an inter-RAT cell reselection from the source RAT to a target RAT while in the dormant state. The method further comprises, upon performing the inter-RAT cell reselection, performing one or more actions to handle dormant state measurement configurations and/or measurements performed in accordance with dormant state measurement configurations. Corresponding embodiments of a wireless device are also disclosed.

8 Claims, 15 Drawing Sheets

Related U.S. Application Data

(60) Provisional application No. 62/825,430, filed on Mar. 28, 2019.

(56) References Cited

U.S. PATENT DOCUMENTS

2018/0352480 A1  12/2018  Dong et al.
2020/0305094 A1   9/2020  Ouchi et al.

OTHER PUBLICATIONS

3GPP TS 36.331 v15.3.0; Technical Specification; 3rd Generation Partnership Project; Technical Specification Group Radio Access Network; Evolved Universal Terrestrial Radio Access (E-UTRA); Radio Resource Control (RRC); Protocol specification (Release 15)—Sep. 2018.

3GPP TS 38.331 v15.4.0; Technical Specification; 3rd Generation Partnership Project; Technical Specification Group Radio Access Network; NR; Radio Resource Control (RRC) protocol specification (Release 15)—Dec. 2018.

3GPP TSG RAN WG1 #96bis; Xi'an, China; Title: RAN2 MR-DC enhancement agreements (R1-1903862)—Apr. 8-12, 2019.

3GPP TSG RAN WG2 #105; Athens, Greece; Source: Ericsson; Title: Signalling of early measurements for CA/DC setup (R2-1900693)—Feb. 25-Mar. 1, 2019.

PCT International Search Report issued for International application No. PCT/SE2020/050105—Apr. 16, 2020.

PCT Written Opinion of the Internatonal Searching Authority issued for International application No. PCT/SE2020/050105—Apr. 16, 2020.

PCT Written Opinion of the International Preliminary Examining Authority issued for International application No. PCT/SE2020/050105—Feb. 24, 2021.

3GPP TSG-RAN WG2#105; Athens, Greece; Source: Ericsson; Title: Measurements for early setup of CA or DC (R2-1900694)—Feb. 25-Mar. 1, 2019.

* cited by examiner

US 12,543,079 B2

HANDLING OF INACTIVE/IDLE MEASUREMENT CONFIGURATIONS AND INACTIVE/IDLE MEASUREMENTS UPON INTER-RAT CELL RESELECTION

RELATED APPLICATIONS

This application claims the benefit of provisional patent application Ser. No. 62/825,430, filed Mar. 28, 2019, the disclosure of which is hereby incorporated herein by reference in its entirety.

PRIORITY

This nonprovisional application is a continuation, under 35 U.S.C. § 120, of U.S. patent application Ser. No. 17/598, 255 filed on Sep. 25, 2021, which is a U.S. National Stage Filing under 35 U.S.C. § 371 of International Patent Application Serial No. PCT/SE2020/050105 filed Feb. 5, 2020 and entitled "HANDLING OF INACTIVE/IDLE MEASUREMENT CONFIGURATIONS AND INACTIVE/IDLE MEASUREMENTS UPON INTER-RAT CELL RESELECTION" which claims priority to U.S. Provisional Patent Application No. 62/825,430 filed Mar. 28, 2019 each of which is hereby incorporated by reference in their entirety.

TECHNICAL FIELD

The present disclosure relates to inactive/idle measurements performed by a wireless device and, in particular, to handling of inactive/idle measurements upon inter-Radio Access Technology (RAT) cell reselection.

BACKGROUND

1.1 Carrier Aggregation (CA) and Dual Connectivity (DC) in Long Term Evolution (LTE)

In Release 10, CA was introduced in LTE to enable the User Equipment (UE) to transmit and/or receive information via multiple cells (so called Secondary Cells—SCell(s)) from multiple carrier frequencies such that the UE can benefit from the existing non-contiguous and contiguous carriers. In CA terminology, the Primary Cell (PCell) is the cell towards which the UE establishes the Radio Resource Control (RRC) connection or performs handover. In CA, cells are aggregated on the Medium Access Control (MAC) level. The MAC layer gets grants for a certain cell and multiplexes data from different bearers to one transport block being sent on that cell. Also, the MAC layer controls how that process is done. This is illustrated in FIG. 1.

SCells can be added (i.e., configured) for the UE using RRC signaling (e.g., RRCConnectionReconfiguration), which takes on the order of hundreds of milliseconds. A cell which is configured for the UE becomes a "serving cell" for this UE. An SCell may also be associated with an SCell state. When configured/added via RRC, an SCell starts in deactivated state. In LTE Release 15, the enhanced or evolved Node B (eNB) can indicate to activate-upon-configuration, or change the state, at least in RRCReconfiguration, as shown below (from Third Generation Partnership Project (3GPP) Technical Specification (TS) 36.331 V15.3.0):

```
1>   for each SCell configured for the UE other than the PSCell:
    2>     if the received RRCConnectionReconfiguration message includes sCellState
           for the SCell and indicates activated:
        3>     configure lower layers to consider the SCell to be in activated state;
    2>     else if the received RRCConnectionReconfiguration message includes
           sCellState for the SCell and indicates dormant.
        3>     configure lower layers to consider the SCell to be in dormant state;
    2>     else:
        3>     configure lower layers to consider the SCell to be in deactivated state;
```

In LTE Release 15, a new intermediate state between the deactivated and active state has been introduced for enhanced uplink operation. This new intermediate state is referred to as the "dormant" state. A MAC Control Element (CE) can be used to change the SCell state between the three states as shown in FIG. 2. There are also timers in the MAC layer to move a cell between deactivated/activated/dormant. These timers are:

sCellHibernationTimer, which moves the SCell from activated state to dormant state, sCellDeactivationTimer, which moves the SCell from activated state to deactivated state, dormantSCellDeactivationTimer, which moves the SCell from dormant state to deactivated state.

The MAC level SCell activation takes on the order of 20-30 milliseconds (ms).

Once the network understands the need to configure and/or activate CA, the question is which cells to initially configure and/or activate, if they are configured, and/or whether a cell/carrier is good enough in terms of radio quality/coverage (e.g., Reference Signal Received Power (RSRP) and Reference Signal Received Quality (RSRQ)). To understand the conditions on SCell(s) or potential SCell(s) on a given available carrier, the network may configure the UE to perform Radio Resource Management (RRM) measurements.

Typically, the network may be assisted by RRM measurements to be reported by a UE. The network may configure the UE with measurement Identities (IDs) associated to reportConfig with event A1 (serving cell becomes better than threshold) in case this is a configured SCell, or A4 (neighbor cell becomes better than threshold) for carriers without a configured SCell. The measurement objects are associated to the carrier the network wants reports on. If the network is aware of the exact cells it wants the UE to measure, a so-called white cell list can be configured in the measurement object so that the UE is only required to measure these cells in that carrier.

FIG. 3 illustrates a process in which the network decides to setup CA or DC for a UE. The network then configures the UE to perform measurements, and the UE sends the appropriate measurement reports to the network. Based on the received measurement reports, the network makes a decision on SCell addition or SCell activation and then configures the UE to add the selected SCell(s). With the introduction of DC in Release 12, it was possible to add what is called Secondary Cell Group (SCG) configuration to the UE. The main benefit would be that the UE could in principle add a cell from another eNB. Protocol-wise, that would require different MAC entities, one for each cell group. The UE will have two cell groups, one associated to the PCell (master node) and another associated to a Primary Secondary Cell (PSCell) (of the secondary eNB), where each group may possibly have their own associated SCells.

When it comes to adding SCells, when the UE is in single connectivity, the RRCConnectionReconfiguration message may carry a cell index (so MAC identifiers are optimized, i.e., shorter), cell identifier and carrier frequency, common parameters, and state information, introduced in Release 15 (activated or dormant).

Below the SCellToAddModListincluded in the RRCConnectionReconfiguration is illustrated and described.

```
SCellToAddModList-r10 ::=            SEQUENCE (SIZE (1..maxSCell-r10)) OF
SCellToAddMod-r10
SCellToAddMod-r10 ::=                SEQUENCE {
    sCellIndex-r10                       SCellIndex-r10,
    cellIdentification-r10               SEQUENCE {
        physCellId-r10                       PhysCellId,
        dl-CarrierFreq-r10                   ARFCN-ValueEUTRA
    }                                                       OPTIONAL,-- Cond
SCellAdd
    radioResourceConfigCommonSCell-r10       RadioResourceConfigCommonSCell-r10
    OPTIONAL,  -- Cond SCellAdd
    radioResourceConfigDedicatedSCell-r10 RadioResourceConfigDedicatedSCell-r10
    OPTIONAL,  -- Cond SCellAdd2
    ...,
    [[ dl-CarrierFreq-v1090               ARFCN-ValueEUTRA-v9e0 OPTIONAL -- Cond
EARFCN-max
    ]],
    [[ antennaInfoDedicatedSCell-v10i0    AntennaInfoDedicated-v10i0 OPTIONAL-
- Need ON
    ]],
    [[ srs-SwitchFromServCellIndex-r14    INTEGER (0.. 31) OPTIONAL-- Need ON
    ]],
    [[ sCellState-r15                     ENUMERATED {activated, dormant} OPTIONAL
    -- Need ON
    ]]
}
```

| RRCConnectionReconfiguration field descriptions |
|---|
| sCellConfigCommon<br>Indicates the common configuration for the SCell group.<br>sCellGroupIndex<br>Indicates the identity of SCell groups for which a common configuration is<br>provided.<br>sCellIndex<br>In case of DC, the SCellIndex is unique within the scope of the UE i.e. an SCG cell<br>can not use the same value as used for an MCG cell. For pSCellToAddMod, if<br>sCellIndex-r13 is present the UE shall ignore sCellIndex-r12. sCellIndex-r13 in<br>sCellToAddModListExt-r13 shall not have same values as sCellIndex-r10 in<br>sCellToAddModList-r10.<br>sCellGroupToAddModList, sCellGroupToAddModListSCG<br>Indicates the SCell group to be added or modified. E-UTRAN only configures at<br>most 4 SCell groups per UE over all cell groups.<br>sCellGroupToReleaseList<br>Indicates the SCell group to be released.<br>sCellState<br>A one-shot field that indicates whether the SCell shall be considered to be in<br>activated or dormant state upon SCell configuration.<br>sCellToAddModList, sCellToAddModListExt<br>Indicates the SCell to be added or modified. Field sCellToAddModList is used to<br>add the first 4 SCells for a UE with sCellIndex-r10 while sCellToAddModListExt is<br>used to add the rest. If E-UTRAN includes sCellToAddModListExt-v1430 it includes<br>the same number of entries, and listed in the same order, as in<br>sCellToAddModListExt-r13. If E-UTRAN includes sCellToAddModList-v10l0 it<br>includes the same number of entries, and listed in the same order, as in<br>sCellToAddModList-r10. If E-UTRAN includes sCellToAddModListExt-v1370 it<br>includes the same number of entries, and listed in the same order, as in<br>sCellToAddModListExt-r13. If E-UTRAN includes sCellToAddModListExt-v13c0 it<br>includes the same number of entries, and listed in the same order, as in<br>sCellToAddModListExt-r13.<br>sCellToAddModListSCG, sCellToAddModListSCG-Ext<br>Indicates the SCG cell to be added or modified. The field is used for SCG cells<br>other than the PSCell (which is added/ modified by field pSCellToAddMod). Field |

-continued

> sCellToAddModListSCG is used to add the first 4 SCells for a UE with sCellIndex-r10 while sCellToAddModListSCG-Ext is used to add the rest. If E-UTRAN includes sCellToAddModListSCG-v10l0 it includes the same number of entries, and listed in the same order, as in sCellToAddModListSCG-r12. If E-UTRAN includes sCellToAddModListSCG-Ext-v1370 it includes the same number of entries, and listed in the same order, as in sCellToAddModListSCG-Ext-r13. If E-UTRAN includes sCellToAddModListSCG-Ext-v13c0 it includes the same number of entries, and listed in the same order, as in sCellToAddModListSCG-Ext-r13.
> sCellToReleaseListSCG, sCellToReleaseListSCG-Ext
> Indicates the SCG cell to be released. The field is also used to release the PSCell e.g. upon change of PSCell, upon system information change for the PSCell.

The procedure to add SCells to the Master Cell Group (MCG) in LTE (or to modify) is described as follows (as in 3GPP TS 36.331 V15.3.0):

> 5.3.5.3    Reception of an RRCConnectionReconfiguration not including the mobilityControlInfo by the UE
> If the RRCConnectionReconfiguration message does not include the mobilityControlInfo and the UE is able to comply with the configuration included in this message, the UE shall:
> ...
> 1>   if the received RRCConnectionReconfiguration includes the sCellToAddModList:
>   2>      perform SCell addition or modification as specified in 5.3.10.3b;
> ...
> 5.3.10.3b     SCell addition/ modification
> The UE shall:
>   1>   for each sCellIndex value included either in the sCellToAddModList or in the sCellToAddModListSCG that is not part of the current UE configuration (SCell addition):
>     2>      add the SCell, corresponding to the cellIdentification, in accordance with the radioResourceConfigCommonSCell and radioResourceConfigDedicatedSCell, both included either in the sCellToAddModList or in the sCellToAddModListSCG;
>     2>      if sCellState is configured for the SCell and indicates activated:
>       3>      configure lower layers to consider the SCell to be in activated state;
>     2>      else if sCellState is configured for the SCell and indicates dormant:
>       3>      configure lower layers to consider the SCell to be in dormant state;
>     2>      else:
>       3>      configure lower layers to consider the SCell to be in deactivated state;
>     2>      for each measId included in the measIdList within VarMeasConfig:
>       3>      if SCells are not applicable for the associated measurement; and
>       3>      if the concerned SCell is included in cellsTriggeredList defined within the VarMeasReportList for this measId;
>         4>      remove the concerned SCell from cellsTriggeredList defined within the VarMeasReportList for this measId;
>   1>   for each sCellIndex value included either in the sCellToAddModList or in the sCellToAddModListSCG that is part of the current UE configuration (SCell modification):
>     2>      modify the SCell configuration in accordance with the radioResourceConfigDedicatedSCell, included either in the sCellToAddModList or in the sCellToAddModListSCG;

1.2 Inter-Radio Access Technology (RAT) and Inter Fifth Generation Core (5GC) Interworking in LTE and New Radio (NR)

Fifth Generation (5G) in 3GPP introduces both a new core network, which is referred to as the 5GC, and a new Radio Access Network (RAN), which is referred to as NR. The 5GC will, however, also support RATs other than NR. It has been agreed that LTE (i.e., Evolved Universal Terrestrial Radio Access (E-UTRA)) should also be connected to 5GC. LTE base stations (eNBs) that are connected to 5GC are called ng-eNBs and are part of Next Generation RAN (NG-RAN), which also includes NR base stations called gNBs. FIG. 4 shows how the base stations are connected to each other and the nodes in 5GC. In particular, FIG. 4 is the 5G System (5GS) architecture containing 5GC and NG-RAN.

There are different ways to deploy a 5G network with or without interworking with LTE and Evolved Packet Core (EPC), as depicted in FIG. 5. In principle, NR and LTE can be deployed without any interworking, denoted by NR Stand-Alone (SA) operation, that is the gNB in NR can be connected to 5GC and the eNB can be connected to EPC with no interconnection between the two (Option 1 and Option 2 in FIG. 5). On the other hand, the first supported version of NR is the so-called Evolved Universal Terrestrial Radio Access Network (E-UTRAN) NR DC (EN-DC), illustrated by Option 3 in FIG. 5. In such a deployment, DC between NR and LTE is applied with LTE as the master and NR as the secondary node. The RAN node (gNB) supporting NR may not have a control plane connection to the core network (EPC); instead, the gNB relies on the LTE as master node (Master eNB (MeNB)). This is also called "Non-standalone NR". Notice that in this case the functionality of an NR cell is limited and would be used for connected mode UEs as a booster and/or diversity leg, but an RRC_IDLE UE cannot camp on these NR cells.

With introduction of 5GC, other options may be also valid. As mentioned above, Option 2 in FIG. 5 supports SA NR deployment where the gNB is connected to 5GC. Similarly, LTE can also be connected to 5GC using Option 5 (also known as enhanced LTE (eLTE), E-UTRA/5GC, or LTE/5GC and the node can be referred to as an ng-eNB). In these cases, both NR and LTE are seen as part of the NG-RAN (and both the ng-eNB and the gNB can be referred to as NG-RAN nodes). It is worth noting that Option 4 and Option 7 are other variants of DC between LTE and NR which will be standardized as part of NG-RAN connected to 5GC, denoted by Multi-Radio DC (MR-DC). Under the MR-DC umbrella, we have:

EN-DC (Option 3): LTE is the master node and NR is the secondary node (EPC Core Network (CN) employed)

NR E-UTRA (NE)-DC (Option 4): NR is the master node and LTE is the secondary node (5GC employed)

Next Generation (NGEN) DC (Option 7): LTE is the master node and NR is the secondary node (5GC employed)

NR-DC (variant of Option 2): DC where both the master and secondary nodes are NR (5GC employed).

As migration for these options may differ from different operators, it is possible to have deployments with multiple options in parallel in the same network, e.g. there could be an eNB base station supporting options 3, 5, and 7 in the same network as an NR base station supporting options 2 and 4. In combination with DC solutions between LTE and NR, it is also possible to support CA in each cell group (i.e., MCG and SCG) and DC between nodes on the same RAT (e.g., NR-NR DC). For the LTE cells, a consequence of these different deployments is the co-existence of LTE cells associated to eNBs connected to EPC, 5GC, or both EPC/5GC.

1.3 Suspend/Resume in LTE and Relation to CA/SCell and SCG Additions

A very typical scenario or use case is a UE with some burst traffic that comes and goes, e.g. some video packets and idle periods of transmission/reception, then comes live again. To save UE power, the network transitions the UE from connected to idle during these periods. Then, the UE comes back again, either via paging or UE request to get connected, and accesses the network.

In LTE Release 13, a mechanism was introduced for the UE to be suspended by the network in a suspended state similar to RRC_IDLE but with the difference that the UE stores the Access Stratum (AS) context or RRC context. This makes it possible to reduce the signaling when the UE is becoming active again by resuming the RRC connection, instead of as prior to establish the RRC connection from scratch. Reducing the signaling could have several benefits:

reduced latency, e.g., for smart phones accessing the Internet, and reduced signaling, which leads to reduced battery consumption for machine type devices sending very little data.

The Release 13 solution is based on the UE sending an RRCConnectionResumeRequestmessage to the network and, in response, the UE may receive an RRCConnectionResume from the network. The RRCConnectionResume is not encrypted but integrity protected.

The resume procedure in LTE can be found in the RRC specifications (3GPP TS 36.331). As the UE performing resume is in RRC_IDLE with suspended AS context, a transition from RRC_IDLE to RRC_CONNECTED is triggered. Hence, this is modelled in the specifications in the same subclause that captures the RRC connection establishment (i.e., subclause 5.3.3 RRC connection establishment).

There are few things relevant to highlight in the SCG configurations and SCell configurations for MCGs in relation to suspend/resume procedures. Upon suspension, it is defined that the UE stores its used RRC configuration. In other words, if the UE is operating in any DC mode and has an SCG configuration or just has configured SCells in the MCG, the UE stores all these configurations. However, upon resume, at least until Release 15, it is defined that the UE releases the SCG configurations and SCell configurations, as shown below:

---

5.3.3.2         Initiation
The UE initiates the procedure when upper layers request establishment or resume of
an RRC connection while the UE is in RRC_IDLE or when upper layers request resume of
an RRC connection or RRC layer requests resume of an RRC connection for, e.g. RNAU
or reception of RAN paging while the UE is in RRC_INACTIVE.
...
Except for NB-IoT, upon initiating the procedure, if connected to EPC or 5GC, the UE
shall:
    1>    if the UE is resuming an RRC connection from a suspended RRC connection or
          from RRC_INACTIVE:
        2>        if the UE is resuming an RRC connection from a suspended RRC
          connection:
            3>    if the UE was configured with EN-DC:
                4>    perform EN-DC release, as specified in TS 38.331 [82], clause 5.3.5.10;
        2>        release the MCG SCell(s), if configured, in accordance with 5.3.10.3a;
        ...
        2>        release the entire SCG configuration, if configured, except for the DRB
          configuration (as configured by drb-ToAddModListSCG);

---

Hence, when the UE comes from RRC_IDLE with the context, if the network wants to add SCell(s) to the MCG or add an SCG, the network needs to do that from scratch, even if the UE is suspending and resuming in the same cell/area where all the previous PCell and SCell configurations are still valid from a radio conditions perspective.

As the use case of UEs with burst traffic constantly being suspended and resumed in the same cell is quite typical, 3GPP has standardized a solution in LTE to enable the UE to assist the network with measurements performed while the UE is in RRC_IDLE so that the network could speed up the setup of CA or DC. That solution is described below.

1.4 Existing Solution for Early Measurements Upon Idle to Connected Transition in LTE (Release 15)

In LTE Release 15, it is possible to configure the UE to report so-called early measurements upon the transition from idle to connected state. These measurements are measurements that the UE can perform in idle state, and according to a configuration provided by the source cell. The intention is for the source cell to receive these measurements immediately after the UE is connected such that the source cell can quickly set up CA and/or other forms of DC (e.g., EN-DC, MR-DC, etc.) without the need to first provide a measurement configuration (measConfig) to the UE in RRC- _CONNECTED, as shown in previous sections, and then wait for hundreds of milliseconds until first samples are collected and monitored and then the first reports are triggered and transmitted to the network.

1.4.1 Measurement Configuration for Early Measurements Upon Resume in LTE

A first aspect of the existing solution, as standardized in E-UTRA 36.331, is described in 5.6.20 Idle Mode Measurements. The UE can receive these idle mode measurement configurations in the system information (System Information Block 5 (SIB5)) in the field MeasIdleConfigSIB-r15, indicating up to 8 cells or ranges of cell IDs on which to perform measurements. In addition, the UE can be configured, upon the transition from RRC_CONNECTED to RRC_IDLE, with a dedicated measurement configuration in the RRCConnectionRelease message with the measIdleDedicated-r15 which overrides the broadcasted configurations in SIB5. The broadcasted and dedicated signaling is shown below:

| RRCConnectionRelease message |
| --- |
| ```
-- ASN1START
RRCConnectionRelease ::=            SEQUENCE {
    rrc-TransactionIdentifier       RRC-TransactionIdentifier,
    criticalExtensions              CHOICE {
        c1                              CHOICE {
            rrcConnectionRelease-r8         RRCConnectionRelease-r8-IEs,
            spare3 NULL, spare2 NULL, spare1 NULL
        },
        criticalExtensionsFuture        SEQUENCE { }
    }
}
-- other info has been omitted
RRCConnectionRelease-v1530-IEs ::=  SEQUENCE {
    drb-ContinueROHC-r15                ENUMERATED {true}           OPTIONAL, -- Cond UP-EDT
    nextHopChainingCount-r15            NextHopChainingCount        OPTIONAL, -- Cond UP-EDT
    measIdleConfig-r15                  MeasIdleConfigDedicated-r15 OPTIONAL, -- Need ON
    rrc-InactiveConfig-r15              RRC-InactiveConfig-r15      OPTIONAL, -- Need OR
    cn-Type-r15                         ENUMERATED {epc,fivegc}     OPTIONAL, -- Need OR
    nonCriticalExtension                SEQUENCE { }                OPTIONAL
}
-- ASN1STOP
                                    MeasIdleConfig information element
-- ASN1START
MeasIdleConfigSIB-r15 ::= SEQUENCE {
    measIdleCarrierListEUTRA-r15 EUTRA-CarrierList-r15,
    ...
}
MeasIdleConfigDedicated-r15 ::= SEQUENCE {
    measIdleCarrierListEUTRA-r15        EUTRA-CarrierList-r15       OPTIONAL, -- Need OR
    measIdleDuration-r15                ENUMERATED {sec10, sec30, sec60, sec120,
                                                   sec180, sec240, sec300, spare},
    ...
}
EUTRA-CarrierList-r15 ::= SEQUENCE (SIZE (1..maxFreqIdle-r15)) OF MeasIdleCarrierEUTRA-r15
MeasIdleCarrierEUTRA-r15::=         SEQUENCE {
    carrierFreq-r15                     ARFCN-ValueEUTRA-r9
    allowedMeasBandwidth-r15            AllowedMeasBandwidth,
    validityArea-r15                    CellList-r15                OPTIONAL, -- Need OR
    measCellList-r15                    CellList-r15                OPTIONAL, -- Need OR
    reportQuantities                    ENUMERATED {rsrp, rsrq, both},
    qualityThreshols-r15                SEQUENCE {
        idleRSRP-THreshold-r15              RSRP-Range
            OPTIONAL, -- Need OR
        idleRSRQ-Threshold-r15              RSRQ-Range-r13
            OPTIONAL --Need OR
    }                                                               OPTIONAL,  --Need OR
    ...
}
CellList-r15 ::=    SEQUENCE (SIZE (1.. maxCellMeasIdle-r15)) OF PhysCellIdRange
-- ASN1STOP
``` |
| MeasIdleConfig field descriptions |
| allowedMeasBandwidth<br>If absent, the value corresponding to the downlink bandwidth indicated by the dl-Bandwidth included in MasterInformationBlock of serving cell applies. |

| RRCConnectionRelease message |
|---|
| carrierFreq
Indicates the E-UTRA carries to be measured during IDLE mode.
measIdleCarrierListEUTRA
Indicates the E-UTRA carriers to be measured during IDLE mode.
measIdleDuration
Indicates the duration for performing measurements during IDLE mode for measurements assigned via RRCConnectionRelease. Value sec10 correspond to 10 seconds, value sec30 to 30 seconds and so on.
qualityThreshold
Indicates the quality thresholds for reporting the measured cells for IDLE mode measurements.
reportQuantities
Indicates which measurement quantities UE is requested to report in the IDLE mode measurement report.
measCellList
Indicates the list of cells which the UE is requested to measure and report for IDLE mode measurements.
validityArea
Indicates the list of cellswithin which UE is requested to do IDLE mode measurements. If the UE reselects to a cell outside this list, the measurements are no longer required. |

Carrier information and cell list: The UE is provided with a list of carriers and optionally with a list of cells on which the UE shall perform measurements. The field s-NonIntraSearch in SystemInformationBlockType3 does not affect the UE measurement procedures in IDLE mode.

Timer T331: Upon the reception of that measurement configuration, the UE starts a timer T331 with the value provided in measIdleDuration, which can go from 0 to 300 seconds. The timer stops upon receiving RRCConnectionSetup, RRCConnectionResume which indicates a transition to RRC_CONNECTED. That concept exists to limit the amount of time the UE performs measurements for that purpose of early measurements.

Validity Area: Another concept introduced in the LTE Release 15 solution is a validity area, which comprises a list of Physical Cell Identities (PCIs). The intention is to limit the area where CA or DC may be setup later when the UE resumes/sets up the connection, so the early measurements are somewhat useful for that purpose. If validityArea is configured and UE reselects to a serving cell whose PCI does not match any entry in validityArea for the corresponding carrier frequency, the timer T331 is stopped. Then, UE stops to perform IDLE measurements and releases the configuration (i.e., VarMeasIdleConfig). Notice that this does not necessarily imply that the UE releases the idle measurements that were configured and that were performed, i.e. these may still be stored and possibly requested by the network. In addition, the UE may continue with IDLE mode measurements according to the broadcasted SIB5 configuration after the timer T331 has expired or stopped.

Minimum quality threshold: Notice also that only measurements above a certain threshold shall be stored as the cell candidates for CA setup need to be within a minimum acceptable threshold. How the UE performs measurements in IDLE mode is up to UE implementation as long as RAN4 requirements for measurement reporting defined in 36.133 are met.

The UE behavior is shown below in more detail as captured in 3GPP TS 36.331:

5.6.20 Idle Mode Measurements
5.6.20.1  General
This procedure specifies the measurements done by a UE in RRC_IDLE when it has an IDLE mode measurement configuration and the storage of the available measurements by a UE in both RRC_IDLE and RRC_CONNECTED.
5.6.20.2  Initiation
While T331 is running, the UE shall:
   1> perform the measurements in accordance with the following:
      2> for each entry in measIdleCarrierListEUTRA within VarMeasIdleConfig:
         3> if UE supports carrier aggregation between serving carrier and the carrier frequency and bandwidth indicated by carrierFreq and allowedMeasBandwidth within the corresponding entry;
         4> perform measurements in the carrier frequency and bandwidth indicated by carrierFreq and allowedMeasBandwidth within the corresponding entry;
NOTE: The fields s-NonIntraSearch in SystemInformationBlockType3 do not affect the UE measurement procedures in IDLE mode. How the UE performs measurements in IDLE mode is up to UE implementation as long as the requirements in TS 36.133 [16] are met for measurement reporting. UE is not required to perform idle measurements if SIB2 idle measurement indication is not configured.

-continued

```
        4>  if the measCellList is included:
            5>     consider PCell and cells identified by each entry within the
                measCellList to be applicable for idle mode measurement reporting;
        4>  else:
            5>     consider PCell and up to maxCellMeasIdle strongest identified cells
                whose RSRP/RSRQ measurement results are above the value(s)
                provided in qualityThreshold (if any) to be applicable for idle mode
                measurement reporting;
        4>  store measurement results for cells applicable for idle mode measurement
            reporting within the VarMeasIdleReport;
    3>  else:
        4>  do not consider the carrier frequency to be applicable for idle mode
            measurement reporting;
1>  if validityArea is configured in VarMeasIdleConfig and UE reselects to a serving
    cell whose physical cell identity does not match any entry in validityArea for the
    corresponding carrier frequency:
    2>      stop T331;
5.6.20.3      T331 expiry or stop
The UE shall:
    1>  if T331 expires or is stopped:
    2>      release the VarMeasIdleConfig;
NOTE: It is up to UE implementation whether to continue IDLE mode measurements
according to SIB5 configuration after T331 has expired or stopped.
```

Notice that it is not mandatory for the source node releasing/suspending the UE to provide a dedicated idle measurement configuration for the purpose of early measurements. If the UE is released/suspended to idle without being provided with a list of carriers to be measured, the UE obtains that from SIB2, as written below:

```
...
1>  if the RRCConnectionRelease message includes the measIdleConfig:
    2>       clear VarMeasIdleConfig and VarMeasIdleReport;
    2>       store the received measIdleDuration in VarMeasIdleConfig;
    2>       start T331 with the value of measIdleDuration;
    2>       if the measIdleConfig contains measIdleCarrierListEUTRA:
        3>       store the received measIdleCarrierListEUTRA in VarMeasIdleConfig;
    2>       else:
        3>       store the measIdleCarrierListEUTRA received in SIB5 in
                 VarMeasIdleConfig;
    2>       start performing idle mode measurements as specified in 5.6.20;
...
```

And, in that case of the list not being provided in RRCConnectionRelease, at every cell reselection the UE performs the SIB5 acquisition to possibly update its list of carriers to measure as shown below:

```
5.2.2.12      Actions upon reception of SystemInformationBlockType5
Upon receiving SystemInformationBlockType5, the UE shall:
...
    1>  if in RRC_IDLE and UE has stored VarMeasIdleConfig_and SIB5 includes the
        measIdleConfigSIB and the UE is capable of IDLE mode measurements for CA:
        2>     if T331 is running and VarMeasIdleConfig does not contain
             measIdleCarrierListEUTRA received from the RRCConnectionRelease message:
            3>     store the measIdleCarrierListEUTRA of measIdleConfigSIB within
                VarMeasIdleConfig;
        2>     perform idle mode measurements on supported carriers as specified in
            5.6.20;
```

If the UE enters a cell within the validity area that is not broadcasting the measurement configuration in SIB5, the UE continues to perform idle measurements according to the SIB5 acquired in the source cell (i.e., the cell the UE was suspended or released).

1.5 RRC_INACTIVE in NR and Possible in LTE Release 15

As part of the standardized work on 5G NR in 3GPP, it has been decided that NR should support an RRC_INACTIVE state with similar properties as the suspended state in LTE Release 13. The RRC_INACTIVE has slightly different properties from the late state in that it is a separate RRC state and not part of RRC_IDLE as in LTE. Additionally, the CN/RAN connection (NG or N2 interface) is kept for RRC_INACTIVE while it was suspended in LTE. FIG. 6 shows possible state transitions in NR.

The properties of the states shown in FIG. 6 are as follows:

RRC_IDLE:
  A UE specific Discontinuous Reception (DRX) may be configured by upper layers;
  UE controlled mobility based on network configuration;
  The UE:
    Monitors a paging channel for CN paging using 5G System Architecture Evolution Temporary Mobile Subscriber Identity (S-TMSI);

Performs neighboring cell measurements and cell (re-) selection;
Acquires system information.
RRC_INACTIVE:
A UE specific DRX may be configured by upper layers or by RRC layer;
UE controlled mobility based on network configuration;
The UE stores the AS context;
The UE:
Monitors a paging channel for CN paging using 5G-S-TMSI and RAN paging using Inactive Radio Network Temporary Identifier (I-RNTI);
Performs neighboring cell measurements and cell (re-) selection;
Performs RAN-based notification area updates periodically and when moving outside the RAN-based notification area;
Acquires system information.
RRC_CONNECTED:
The UE stores the AS context;
Transfer of unicast data to/from UE;
At lower layers, the UE may be configured with a UE specific DRX;
For UEs supporting CA, use of one or more SCells, aggregated with the Special Cell (SpCell), for increased bandwidth;
For UEs supporting DC, use of one SCG, aggregated with the MCG, for increased bandwidth;
Network controlled mobility, i.e. handover within NR and to/from E-UTRAN;
The UE:
Monitors a paging channel;
Monitors control channels associated with the shared data channel to determine if data is scheduled for it;
Provides channel quality and feedback information;
Performs neighboring cell measurements and measurement reporting;
Acquires system information.

1.6 Introducing of Early Measurements Upon Idle/Inactive to Connected Transition in NR (Release 16)

A work item has been approved in Release 16 to enhance the setup of CA/DC in NR. The Work Item Description (WID) "Enhancing CA Utilization" was approved in RAN #80 in RP-181469 and updated in RAN #81 in RP-182076, and one of the objectives is the following:

---

Early Measurement reporting: Early and fast reporting of measurements information availability from neighbor and serving cells to reduce delay setting up MR-DC and/or CA. [RAN2, RAN4]
  o   This objective applies to MR-DC, NR-NR DC and CA
  o   The objective should consider measurements in IDLE, INACTIVE mode and CONNECTED mode
  o   The impacts on UE power consumption should be minimized
  o   The LTE Rel-15 euCA work should be utilized, when applicable

---

Hence, 3GPP is going to investigate solutions to enable early measurements performed when the UE is in RRC_INACTIVE or RRC_IDLE state and reporting mechanisms for when the UE enters RRC_CONNECTED.

Based on contributions submitted to RAN2 #105 to Athens, three different kinds of solutions are going to be considered:

1. UE reports early measurements in UEInformationResponse after a request from a network in UEInformationRequest is transmitted after the UE sends an RRCResumeComplete/RRCConnectionResumeComplete, or after security is activated when the UE comes from idle without stored context;
2. UE reports early measurements with (e.g., multiplexed with or as part of the message) RRCResumeComplete/RRCConnectionResumeComplete/RRCSetupComplete/RRCConnectionSetupComplete/SecurityModeComplete, etc.;
3. UE reports early measurements with (e.g., multiplexed with or as part of the message) RRCResumeRequest/RRCConnectionResumeRequest/RRCSetupRequest/RRCConnectionSetupRequest.

There are some differences in details of each of these solutions, and not all of them may be applicable for RRC_IDLE in the same way they are for RRC_INACTIVE. However, in any of these solutions for the reporting, the UE relies on a measurement configuration, which may be provided with dedicated signaling when the UE is suspended to RRC_INACTIVE or when the UE is released to RRC_IDLE. That measurement configuration indicates how the UE is to perform these measurements to be reported when the UE resumes (in the case of coming from RRC_INACTIVE or sets up a connection, in the case of coming from RRC_IDLE).

2 Problems with Existing Solutions

The currently exist certain challenge(s). In regard to inter-RAT cell selection in RRC_IDLE or RRC_INACTIVE, according to current RRC specifications (3GPP TS 38.331 Rel-15, V15.4.0 (2018-12)), a UE in RRC_INACTIVE, which re-selects to an inter-RAT cell will transition to RRC_IDLE. Specifically, the UE behavior in NR RRC_INACTIVE according to 3GPP TS 38.331 is:

---
5.3.13.12 Inter RAT cell reselection
Upon reselecting to an inter-RAT cell, the UE shall:
1> perform the actions upon going to RRC_IDLE as specified in 5.3.11, with release cause 'other'.

---

Similarly, the UE behavior in E-UTRA/5GC RRC_INACTIVE according to 3GPP TS 36.331 is:

---
5.3.17.3 Inter RAT cell reselection or CN type change
Upon reselecting to an inter-RAT cell or to another CN type, the UE shall:
1> perform the actions upon leaving RRC_INACTIVE as specified in 5.3.12, with release cause 'other'.

---

UE behavior in E-UTRA RRC_INACTIVE according to 3GPP TS 36.304 is:

---
5.2.4.11 Cell reselection when storing UE AS context
For UEs storing UE AS context and resumeIdentity as specified in TS 36.331 [3], upon cell reselection to another RAT, the UE shall discard the stored UE AS context and resumeIdentity.

---

It is not clear the UE behavior should be regarding idle/inactive measurements when the UE re-selects to an inter-RAT cell assuming the existing inter-RAT re-selection handling solution. The reason is that, if the UE is in RRC_INACTIVE, the UE will transition to RRC_IDLE and release the UE Inactive AS Context, which is also known as UE AS Context in E-UTRA. In LTE, where the idle measurement configuration/reporting has been specified, it is not clear how the idle measurement configurations and results are handled, which can cause ambiguity between the behavior of the UE and that of the network (e.g., the UE may keep the measurement configurations/results, while network expects the UE to release them).

SUMMARY

Systems and methods are disclosed herein that relate to handling of dormant state (e.g., IDLE/INACTIVE state) measurement configurations and associated measurements upon inter-Radio Access Technology (RAT) cell reselection in a cellular communications system. Embodiments of a method performed by a wireless device and corresponding embodiments of a wireless device are disclosed. In some embodiments, a method performed by a wireless device comprises receiving one or more dormant state measurement configurations from a network node of a source RAT, performing measurements while in a first dormant state in accordance with at least one of the one or more dormant state measurement configurations, and performing an inter-RAT cell reselection from the source RAT to a target RAT while in the first dormant state. The method further comprises, upon performing the inter-RAT cell reselection from the source RAT to the target RAT while in the first dormant state, performing one or more actions to handle dormant state measurement configurations, to handle early measurements performed in accordance with dormant state measurement configurations, or to handle both dormant state measurement configurations and measurements performed in accordance with dormant state measurement configurations.

In some embodiments, the one or more dormant state measurement configurations comprise one or more dormant state measurement configurations for the source RAT of the wireless device, and the one or more actions comprise stopping performance of measurements made in accordance with the one or more dormant state measurement configurations for the source RAT. In some embodiments, stopping performance of early measurements made in accordance with the one or more dormant state measurement configurations for the source RAT comprises stopping a timer that limits an amount of time that the wireless device is to perform measurements in accordance with the one or more dormant state measurement configurations for the source RAT. In some embodiments, stopping performance of measurements made in accordance with the one or more dormant state measurement configurations for the source RAT comprises releasing the one or more dormant state measurement configurations for the source RAT. In some embodiments, the one or more actions further comprise transitioning to a second dormant state in the target RAT.

In some embodiments, the one or more actions comprise stopping performance of measurements made while in a dormant state.

In some embodiments, at least one of the one or more actions is configured by the network node.

In some embodiments, the one or more dormant state measurement configurations received from the network node comprise one or more dormant state measurement configurations for measuring on cells, frequencies, and/or beams associated with the source RAT. In some embodiments, the one or more dormant state measurement configurations received from the network node comprise one or more dormant state measurement configurations for measuring on cells, frequencies, and/or beams associated with the target RAT. In some embodiments, the one or more dormant state measurement configurations received from the network node comprise one or more dormant state measurement configurations for measuring on cells, frequencies, and/or beams associated with the source RAT and the target RAT.

In some embodiments, the method further comprises reporting the early measurements to a target RAT network node.

In some embodiments, a wireless device is adapted to receive one or more dormant state measurement configurations from a network node of a source RAT, perform measurements while in a first dormant state in accordance with at least one of the one or more dormant state measurement configurations, and perform an inter-RAT cell reselection from the source RAT to a target RAT while in the first dormant state. The wireless device is further adapted to, upon performing the inter-RAT cell reselection from the source RAT to the target RAT while in the first dormant state, perform one or more actions to handle dormant state measurement configurations, to handle measurements performed in accordance with dormant state measurement configurations, or to handle both dormant state measurement configurations and measurements performed in accordance with dormant state measurement configurations.

In some embodiments, the wireless device comprises one or more transmitters, one or more receivers, and processing circuitry associated with the one or more transmitters and the one or more receivers. The processing circuitry is configured to cause the wireless device to receive the one or more dormant state measurement configurations from the network node of the source RAT, perform the measurements while in the first dormant state in accordance with the at least one of the one or more dormant state measurement configurations, perform the inter-RAT cell reselection from the source RAT to the target RAT while in the first dormant state, and, upon performing the inter-RAT cell reselection from the source RAT to the target RAT while in the first dormant state, perform the one or more actions to handle dormant state measurement configurations, to handle measurements performed in accordance with dormant state measurement configurations, or to handle both dormant state measurement configurations and measurements performed in accordance with dormant state measurement configurations.

Embodiments of a method performed by a base station are also disclosed. In some embodiments, a method performed by a base station using a source radio RAT comprises providing one or more dormant state measurement configurations to a wireless device in the source RAT and providing, to the wireless device, information that indicates one or more actions to be performed by the wireless device upon inter-RAT cell reselection from the source RAT to a target RAT while in a dormant state in order to handle measurements performed in accordance with dormant state measurement configurations, or to handle both dormant state measurement configurations and measurements performed in accordance with dormant state measurement configurations.

In some embodiments, the one or more dormant state measurement configurations provided to the wireless device comprise one or more dormant state measurement configurations for measuring on cells, frequencies, and/or beams associated with the source RAT, one or more dormant state measurement configurations for measuring on cells, frequencies, and/or beams associated with the target RAT, or one or more dormant state measurement configurations for measuring on cells, frequencies, and/or beams associated with the source RAT and the target RAT.

In some embodiments, the one or more actions comprise any one or combination of the following actions: transitioning to a second dormant state in the target RAT; stop performing measurement according to one or more source RAT measurement configurations, the one or more source RAT measurement configurations being comprised in the one or more dormant state measurement configurations; stop performing early measurements; releasing current measurements performed according to the one or more dormant state measurement configurations.

Corresponding embodiments of a base station are also disclosed. In some embodiments, a base is adapted to provide one or more dormant state measurement configurations to a wireless device using a source RAT and provide, to the wireless device, information that indicates one or more actions to be performed by the wireless device upon inter-RAT cell reselection from the source RAT to a target RAT while in a dormant state in order to handle measurements performed in accordance with dormant state measurement configurations, or to handle both dormant state measurement configurations and measurements performed in accordance with dormant state measurement configurations.

In some embodiments, the base station comprises processing circuitry configured to cause the base station to provide the one or more dormant state measurement configurations to the wireless device using the source RAT and provide, to the wireless device, the information that indicates the one or more actions to be performed by the wireless device upon inter-RAT cell reselection from the source RAT to the target RAT while in a dormant state in order to handle measurements performed in accordance with dormant state measurement configurations, or to handle both dormant state measurement configurations and measurements performed in accordance with dormant state measurement configurations.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
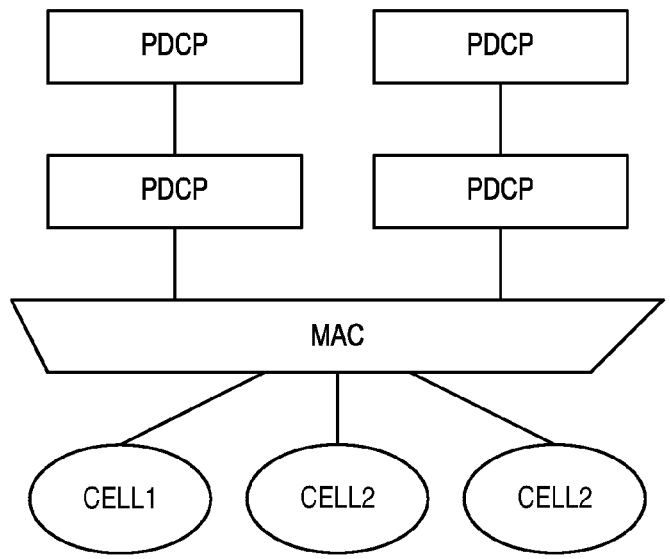
FIG. 1 illustrates the operation of the Medium Access Control (MAC) layer for Carrier Aggregation (CA)
Figure 2:
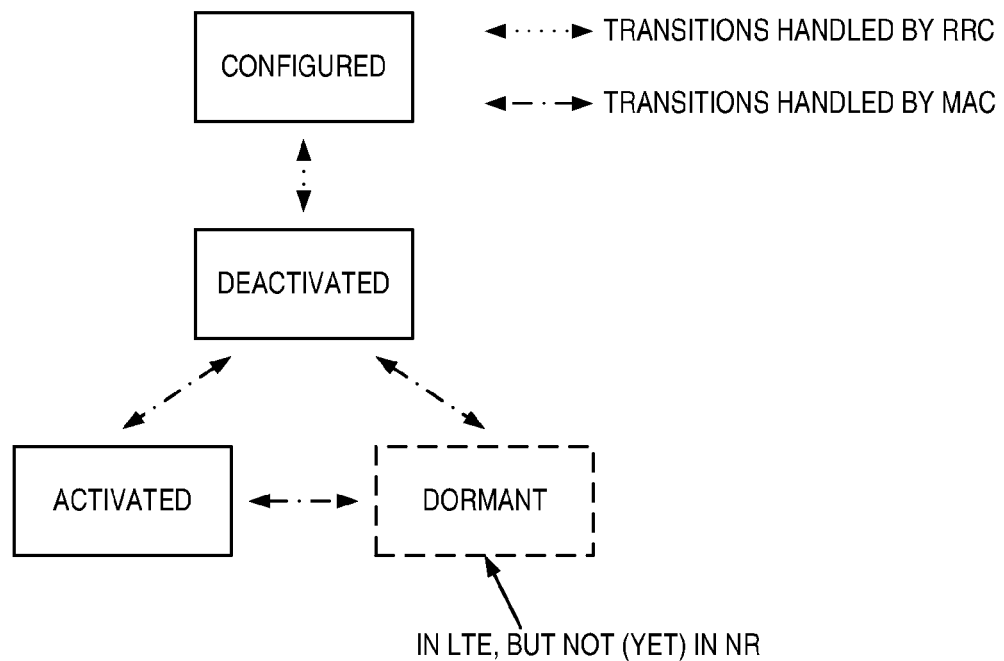
FIG. 2 illustrates transitions between three User Equipment (UE) states in Long Term Evolution (LTE)
Figure 3:
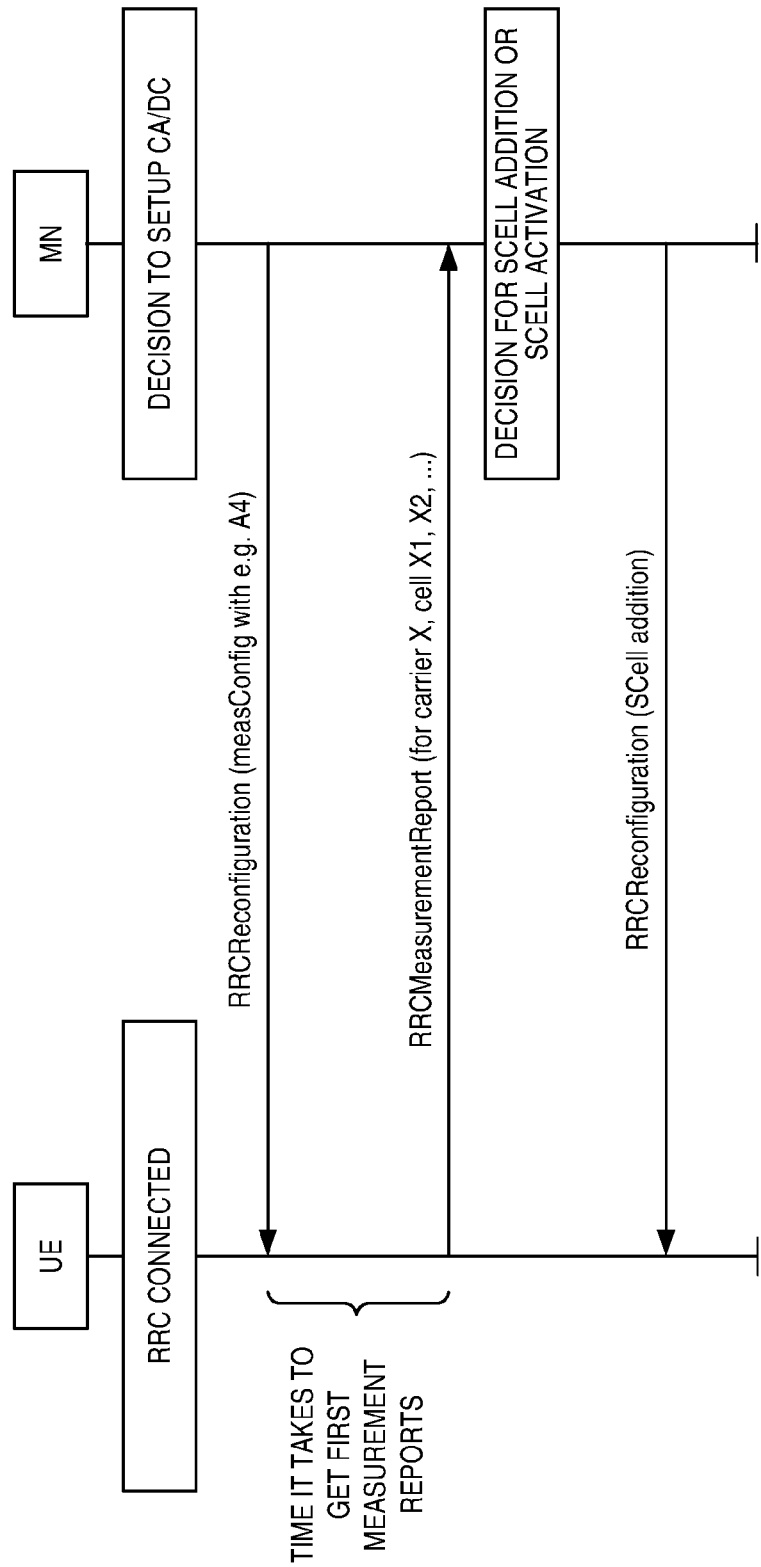
FIG. 3 illustrates a conventional process in which the network decides to setup CA or Dual Connectivity (DC) for a UE.
Figure 4:
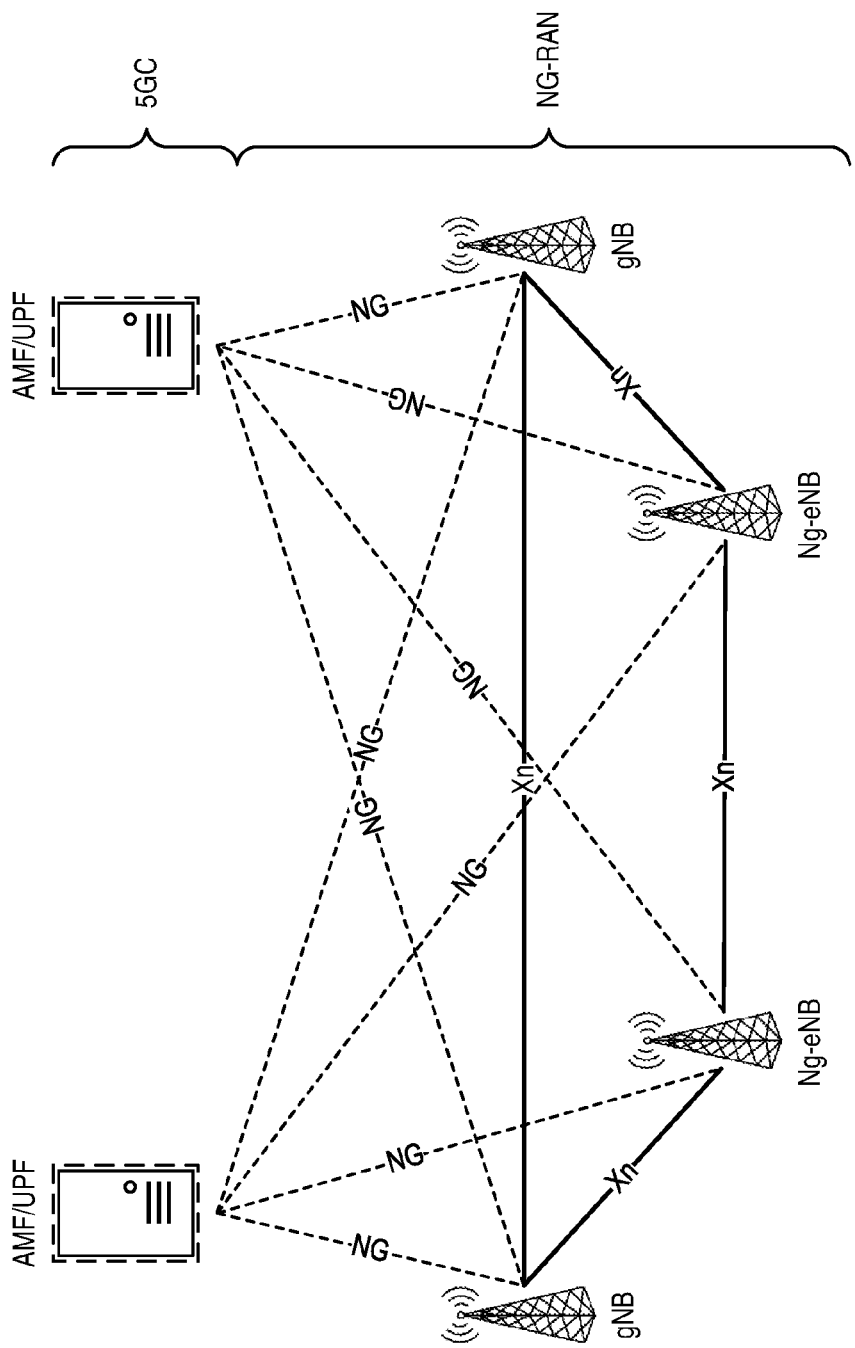
FIG. 4 shows interconnections between base stations and other base stations and core network nodes in a Fifth Generation (5G) System (5GS)
Figure 5:
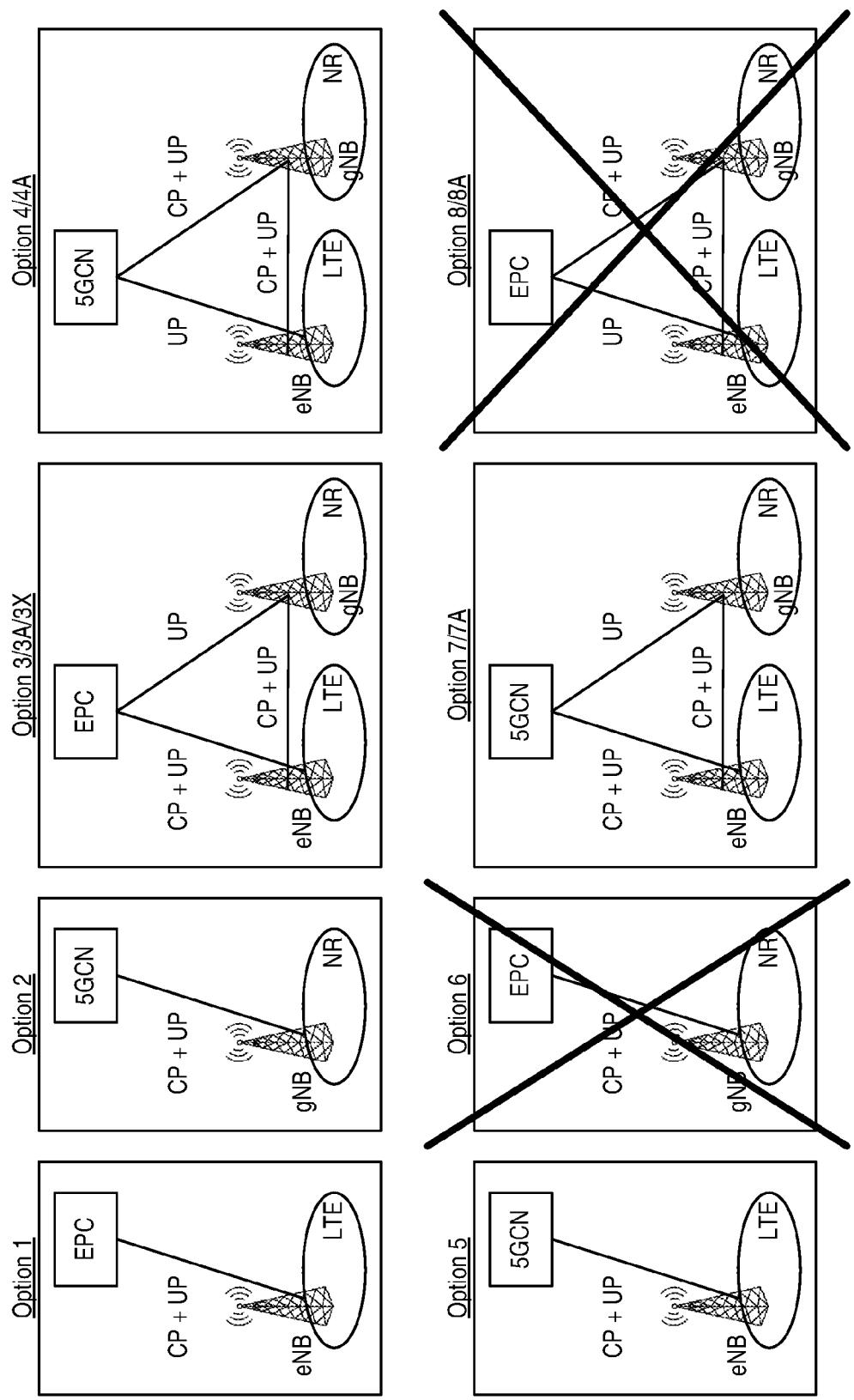
FIG. 5 illustrates different ways to deploy a 5G network with or without interworking with LTE.
Figure 6:
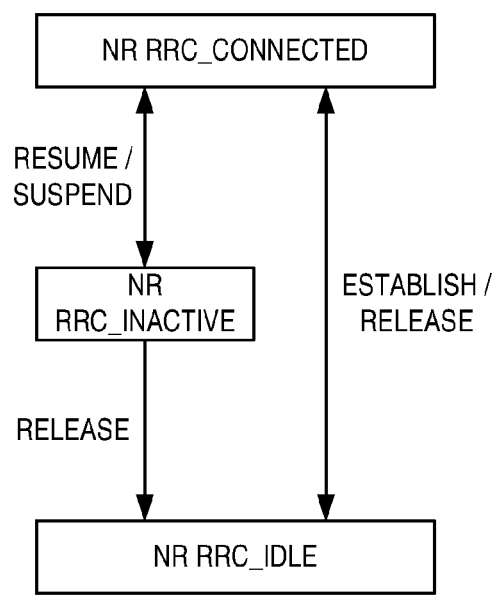
FIG. 6 shows possible state transitions for a UE in 5G New Radio (NR)

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless device.

Radio Access Node: As used herein, a "radio access node" or "radio network node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), and a relay node.

Core Network Node: As used herein, a "core network node" is any type of node in a Core Network (CN) or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing an Access and Mobility Management Function (AMF), a User Plane Function (UPF), a Session Management Function (SMF), an Authentication Server Function (AUSF), a Network Slice Selection Function (NSSF), a Network Exposure Function (NEF), a Network Repository Function (NRF), a Policy Control Function (PCF), a Unified Data Management (UDM), or the like.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a User Equipment (UE) in a 3GPP network and a Machine Type Communication (MTC) device.

Network Node: As used herein, a "network node" is any node that is either part of the RAN or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

Embodiments of the present disclosure apply to the case where a UE performs inter-Radio Access Technology (RAT) and or inter-system cell reselection while in a dormant state (e.g., LTE/NR IDLE, LTE/NR INACTIVE, LTE IDLE with suspended). The example embodiments described below are mostly regarding the handling of idle/inactive measurements during an inter-RAT cell reselection while in dormant state in NR. However, the embodiments described herein are equally applicable to LTE (e.g., LTE IDLE, LTE IDLE with suspended, LTE INACTIVE).

In the example embodiments, the term source RAT and source node refer to the RAT and network node respectively which the UE was connected to when it was released to the dormant state. Similarly, the term target RAT and target node refer to the RAT and network node in which the UE re-selects to while in the dormant state.

The term source RAT and target RAT should also be considered to represent the case where the source RAT and target RAT are of the same type, but connected to different core networks, i.e. Evolved Universal Terrestrial Radio Access (E-UTRA) connected to Evolved Packet Core (EPC) or E-UTRA connected to 5G Core (5GC).

The terms node, cell, and RAT are used interchangeably when referring to a source or target node/cell/RAT.

It should be noted that the UE behavior can either be configured by the network via broadcasted or dedicated signaling, or specified in the standards (here we cover the details of the case where the network configures the UE behavior).

Certain aspects of the present disclosure and their embodiments may provide solutions to the aforementioned challenges related to idle mode measurements and inter-RAT reselection or other challenges. The present disclosure provides embodiments of a UE and a network node and corresponding embodiments of methods of operation of a UE and a network node that handle idle/inactive measurements when the UE performs inter-RAT reselection. Several options are proposed on how to handle the previous measurement configurations and results, namely:

release both the measurement configurations and results, or release the measurement configuration but keep the results, keep the measurement configuration but clear the results, or keep both the measurement configuration and the results.

In case the measurement configurations and/or results are kept when moving from one RAT to another RAT, the format and content of the configurations and/or results may be adapted, converted, or modified to match the specified format of the target RAT.

Some sub-cases and combinations of the above are also possible, as described below (e.g., keeping only part of the previous measurement configuration and/or results).

Embodiments of the present disclosure resolve the ambiguity regarding the idle/inactive measurements configurations and results when a UE performs inter-RAT cell re-selection and provide flexible mechanisms where the network can configure the UE to keep or release idle/inactive measurement configurations and/or results to the target RAT (or UE behavior specified in the standards).

Embodiments of the present disclosure further allow the UE to adapt the idle/inactive measurement configurations and/or results from the source RAT to the target RAT configuration or format in order to ensure the idle/inactive measurement results can be reported in the target RAT in a format the target RAT can interpret.

Certain embodiments may provide one or more of the following technical advantage(s). For example, in LTE, even though the idle measurement configuration and early measurement reporting have been specified, the behavior when the UE performs inter-RAT cell reselection is not fully specified. This could lead to the network expecting the UE to behave in one way while the UE behaves in another (e.g., the network expects the UE to keep measuring based on previous configurations, while the UE releases the measurement configurations/results or vice versa). If the LTE solutions are adopted in NR, the same issue will be carried over to NR. Embodiments of the present disclosure resolve this ambiguity and provide flexible mechanisms where the network can configure the UE to keep or release idle/inactive measurement configurations and/or results (or UE behavior specified in the standards).

Figure 7:
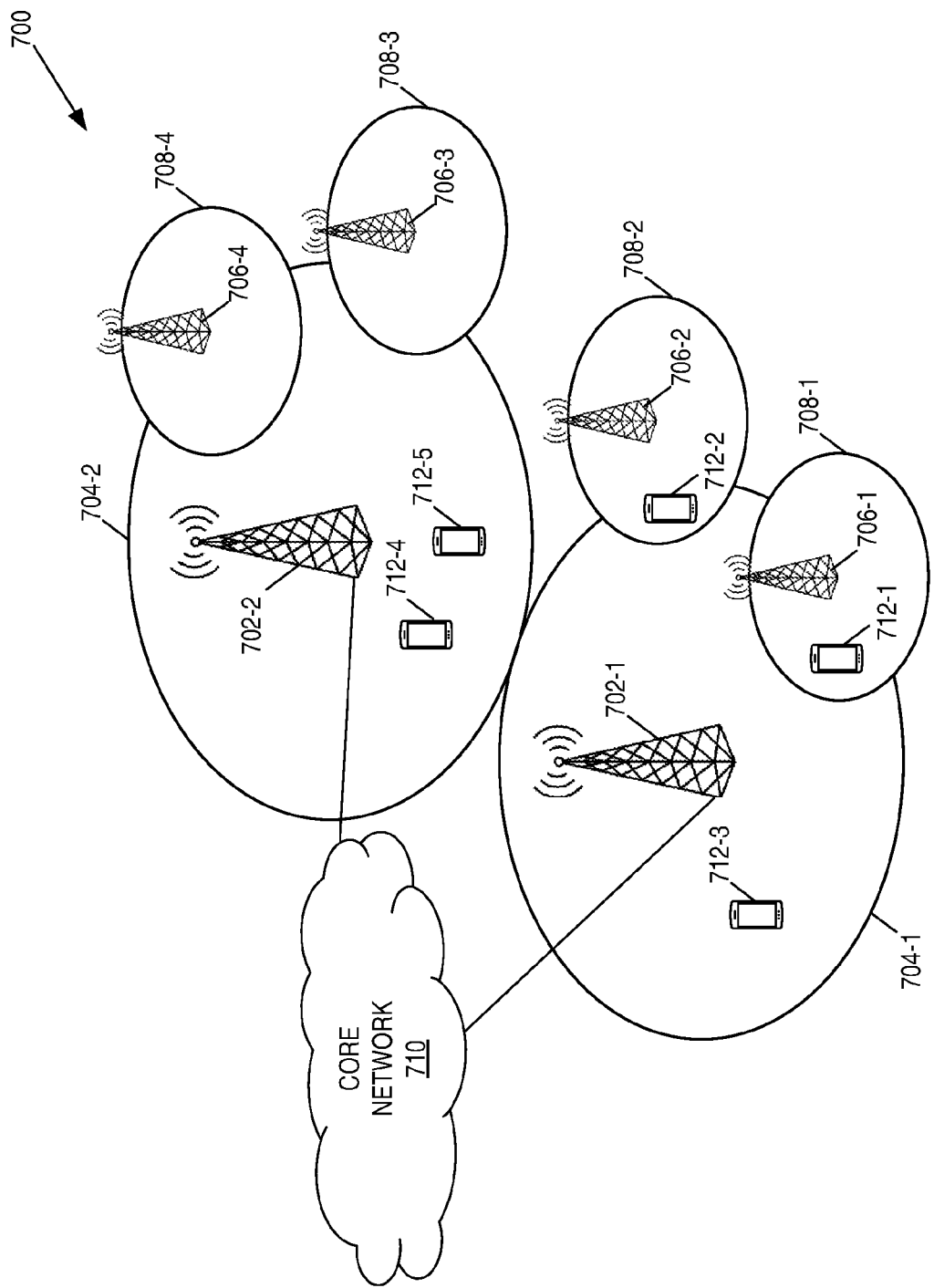
FIG. 7 illustrates one example of a cellular communications system in which embodiments of the present disclosure may be implemented.

In this regard, FIG. 7 illustrates one example of a cellular communications system 700 in which embodiments of the present disclosure may be implemented. In the embodiments described herein, the cellular communications system 700 is an LTE or 5G NR network. In this example, the cellular communications system 700 includes a radio access network including base stations 702-1 and 702-2, which in LTE are referred to as eNBs and in 5G NR are referred to as gNBs, controlling corresponding macro cells 704-1 and 704-2. The base stations 702-1 and 702-2 are generally referred to herein collectively as base stations 702 and individually as base station 702. Likewise, the macro cells 704-1 and 704-2 are generally referred to herein collectively as macro cells 704 and individually as macro cell 704. The radio access network of the cellular communications system 700 may also include a number of low power nodes 706-1 through 706-4 controlling corresponding small cells 708-1 through 708-4. The low power nodes 706-1 through 706-4 can be small base stations (such as pico or femto base stations) or Remote Radio Heads (RRHs), or the like. Notably, while not illustrated, one or more of the small cells 708-1 through 708-4 may alternatively be provided by the base stations 702. The low power nodes 706-1 through 706-4 are generally referred to herein collectively as low power nodes 706 and individually as low power node 706. Likewise, the small cells 708-1 through 708-4 are generally referred to herein collectively as small cells 708 and individually as small cell 708. The cellular communications system 700 also includes a core network 710 to which the base stations 702 (and optionally the low power nodes 706) are connected.

The base stations 702 and the low power nodes 706 provide service to wireless devices 712-1 through 712-5 in the corresponding cells 704 and 708. The wireless devices 712-1 through 712-5 are generally referred to herein collectively as wireless devices 712 and individually as wireless device 712. The wireless devices 712 are also sometimes referred to herein as UEs.

Now, the discussion will turn to details regarding some example embodiments of the present disclosure. These example embodiments are described with respect to LTE and NR and, as such, LTE and NR terminology is oftentimes used. Note, however, the present disclosure is not limited to LTE and NR. Rather, the embodiments described herein may be implemented in any suitable type of wireless communication system.

UE EMBODIMENTS

Figure 8:
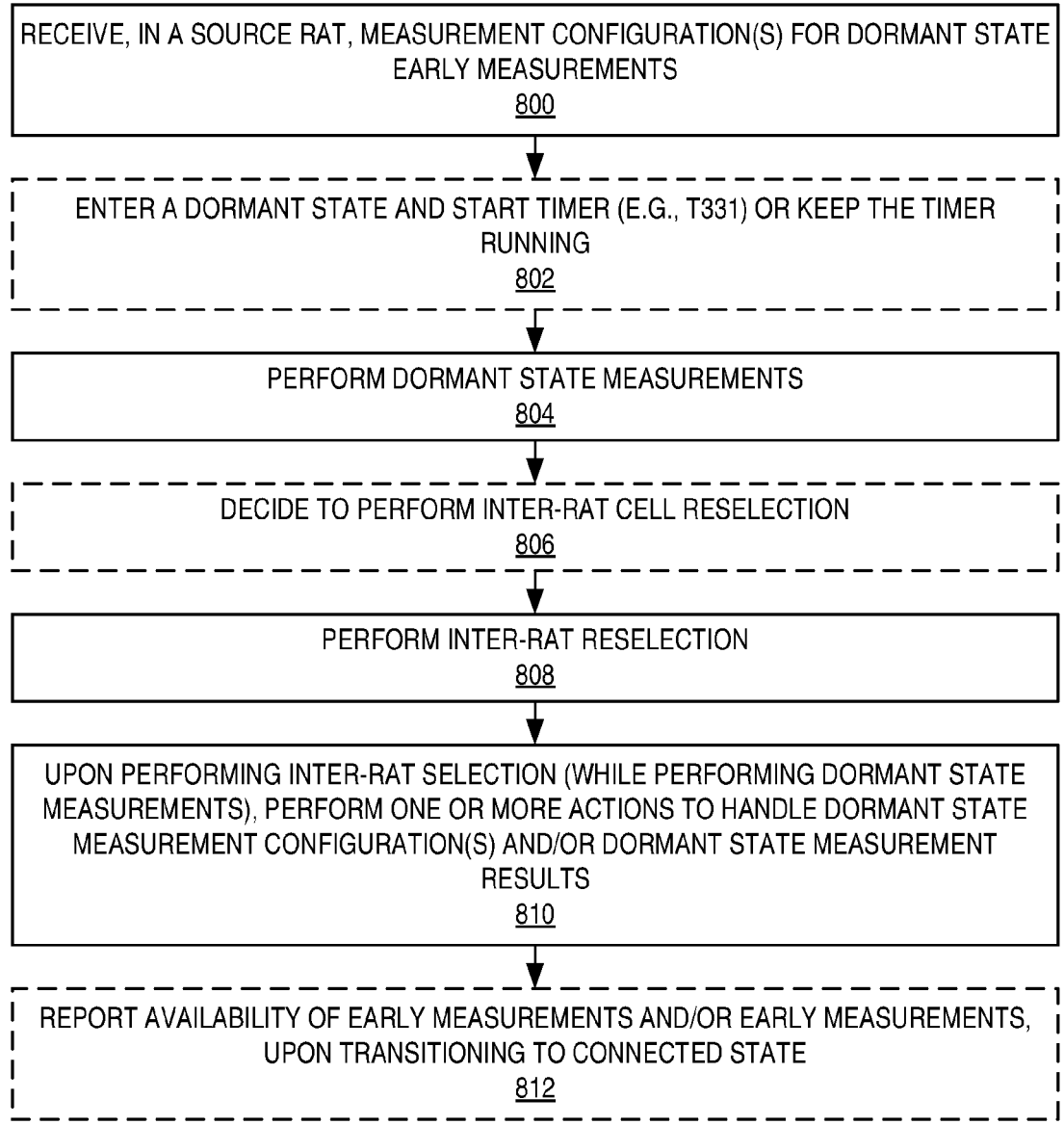
FIG. 8 is a flow chart that illustrates the operation of a UE in accordance with embodiments of the present disclosure.

Embodiments of a method executed by the UE for the handling of inactive/idle measurement configuration the UE applies during a dormant state (LTE/NR IDLE, LTE IDLE with suspended, LTE/NR INACTIVE), specifically upon performing inter-RAT cell reselection, are disclosed herein. In some embodiments, as illustrated in FIG. 8, the method executed by the UE includes:

Step 800: The UE receives a measurement configuration (s) in a source RAT to perform idle/inactive measurement configurations (e.g., via RRCRelease, RRCConnectionRelease, system information broadcast, etc.). This measurement configuration(s) is also referred to herein as a dormant state measurement configuration, a dormant state early measurement configuration, or a power saving state measurement configuration.

In one sub-variant, the UE is configured to measure on cells, frequencies, and/or beams associated with the source RAT;

In one sub-variant, the UE is configured to measure on cells, frequencies, and/or beams associated with the target RAT;

In one sub-variant, the UE is configured to measure on cells, frequencies, and/or beams associated with the source RAT and the target RAT.

Step 802 (Optional): The UE enters a dormant state and starts a timer (e.g., T331) or keeps the timer running.

Step 804: While in the dormant state (and while the timer is running), the UE performs dormant state early measurements (i.e., idle/inactive state or mode measurements) in accordance with the measurement configuration(s).

Step 806 (Optional): The UE decides to perform inter-RAT cell reselection based on idle/inactive mode cell reselection procedures.

Step 808: The UE performs inter-RAT cell reselection.

Step 810: Upon performing the inter-RAT cell reselection procedure while performing idle/inactive measurements, the UE performs one or more actions to handle dormant state measurement configuration(s) and/or dormant state measurement results with respect to the inter-RAT reselection. These one or more actions may include any one or any combination of the following:

In one variant, the UE remains in the same power saving state (e.g., RRC_INACTIVE, RRC_IDLE with suspended RRC Connection, RRC_IDLE without suspended RRC Connection, etc.). Note that the terms power saving state and dormant state are used interchangeably herein.

In another variant, the UE transitions to another power saving state (e.g., RRC_INACTIVE, RRC_IDLE with suspended RRC Connection, RRC_IDLE without suspended RRC Connection).

In one variant related to the idle/inactive measurement configurations (C1):

The UE stops performing idle/inactive measurements according to the source RAT configuration.

This includes stopping all actions related to early inactive/idle measurements, such as stopping timer T331, stopping performing measurements, releasing the measurement configurations for early idle/inactive measurements, etc.

In one sub-variant, if the target RAT has provided an idle/inactive mode measurement configuration via system information broadcast, the UE applies these configurations and starts performing idle measurements accordingly.

In one sub-variant, the UE will not perform idle measurements anymore, even if the target RAT has provided an idle/inactive mode configuration via system information broadcast.

In another variant related to the idle/inactive measurement configurations (C2):

The UE keeps performing the early measurements according to the previous idle/inactive measurement configurations.

In one sub-variant, the UE keeps a subset of the measurement configurations and continues measuring according to these configurations.

This could be measurements that are relevant only while camping at the target RAT (e.g., if the cell selection was from NR to LTE, only keep measurement configurations at the cell level instead of beam level on NR frequencies after the cell reselection); and/or The UE keeps a subset of the measurement configurations that are relevant to the IDLE mode (e.g., related to beam measurements and/or CSI-RS measurements, that are relevant to the INACTIVE mode but not to the IDLE mode; and/or In another sub-variant, the UE keeps the ancillary configuration parameters such as the validity area, idleMeasDuration, etc.

The UE may not restart the timer T331 (e.g., if the timer in the source RAT was set to x seconds, and the UE performs the inter-RAT reselection after y seconds, the UE will keep running the timer for an extra x-y seconds after the cell reselection, or it will start a new timer with a value of x-y seconds upon cell reselection.

The UE may restart the timer T331 with the initial value configured in the source RAT.

In one sub-variant, if the target RAT has provided an idle/inactive mode measurement configuration via system information broadcast, the UE applies these configurations on top of the previous configuration from the source RAT (or whatever configurations were decided to be kept according to the sub-variants above) (i.e., delta configuration).

In one sub-variant, the UE keeps the idle measurements configurations (or whatever configurations were decided to be kept according to the sub variants above) only if the target RAT has not provided an idle/inactive mode measurement configuration via system information broadcast.

In one variant, the UE converts the configurations provided by the source RAT to the format of the target RAT and starts the idle/inactive measurements according to the target RAT.

In one sub-variant, the source RAT indicates to the UE how to convert the measurement configurations if the UE re-selects to an inter-RAT cell.

In another sub-variant, the target RAT indicates to the UE how to convert the measurement configurations, when the UE re-selects to an inter-RAT cell.

In one variant related to the idle/inactive measurement results (R1):

The UE releases the current measurement results performed according to the source RAT.

In one sub-variant, such a release of the measurement results is performed only if the target RAT has provided an idle/inactive mode measurement configuration via system information broadcast.

In one sub-variant, such a release of the measurement results is performed even if the target RAT has not provided an idle/inactive mode measurement configuration via system information broadcast.

In another variant related to the early measurement results (R2):

In one sub-variant (R2-1), the UE keeps the current measurement results regardless of the handling of the current measurement configurations (i.e., both for cases C1 or C2 above).

In another sub-variant (R2-2), the UE keeps the current measurement results only if the handling of the measurement configurations is such that the current configurations are kept (i.e., only for C2 above).

In another sub-variant (R2-3), the UE keeps the current measurement results only if the handling of the measurement configurations is such that the current configurations are kept and the timer T331 is not restarted.

In another sub-variant (R2-4), the UE keeps the current measurement results only if the handling of the measurement configurations is such that the current configurations are kept whether the timer T331 is restarted or not.

In one sub-variant (R2-5), the UE releases a subset of the measurement results, e.g. related to beam measurements and/or CSI-RS measurements, that are relevant to the INACTIVE mode but not to the IDLE mode. The UE will keep the remaining measurement results.

In one sub-variant (R2-6), the UE releases a subset of the measurement results, e.g. related to beam measurements and/or CSI-RS measurements, that are relevant to the source RAT but not to the target RAT. The UE will keep the remaining measurement results.

If the decision by the UE was to keep the old measurement results:

The new and the old measurement results are kept in the same UE parameter (e.g., VarMeasIdleReport if the target RAT is E-UTRA); or The new and old measurement results are kept in different UE parameters (e.g., if the source RAT was E-UTRA and the target RAT is NR, the previous results will be kept in a UE variable (e.g., VarMeasIdleReport) and the new results can be kept in another variable (i.e., VarMeasIdleInactiveReport); or Some of the old measurements are converted to the target RAT format kept with the new measurements in one UE parameter (e.g., VarMeasIdleReport), and the rest of the old measurements are kept in another UE variable (e.g., VarMeasIdleInactiveReport); or Some of the old measurements are converted to the target RAT format kept with the new measurements in one UE parameter (e.g., VarMeasIdleReport), and the rest of the old measurements are released.

Step 812 (Optional): Upon establishing a connection from RRC_IDLE or resuming a connection from RRC_INACTIVE or RRC_IDLE with suspend, the UE reports the available (if any) idle/inactive measurements using procedures applicable for early measurement reporting in RRC_IDLE or RRC_INACTIVE.

In one sub-variant, if the target and source RAT measurement configurations are different and/or if the IDLE and INACTIVE measurement configurations are different and the configuration of the UE was so that the UE keeps the measurements performed in the source and target RATS, then the early measurement reporting signaling is enhanced to include the measurements performed in the source and target RATs, and/or in the INACTIVE and IDLE states.
  In one sub-variant, the UE indicates the availability of measurements belonging to the source and target RAT with a single indication.
  In another sub-variant, the UE indicates the availability of measurements belonging to the source and target RAT using separate indications.
  In another sub-variant, the UE does not indicate the availability of measurements, but the network can request the measurements blindly or using information about the UE configuration.
In one alternative, upon establishing a connection from a dormant state, the UE indicates that it has a certain idle/inactive measurement configuration, e.g. from one or several specific RAT(s), and/or measurement results based on such idle/inactive measurement configuration(s) available. The network then indicates to the UE through dedicated signaling (as part of the procedure to establish/resume the connection) whether to maintain or release each such available idle/inactive measurement configuration and/or whether to provide (or not) the corresponding measurement result(s). The network can also indicate to the UE through such dedicated signaling whether the UE should continue the measurements, e.g. whether to keep at least parts of the idle/inactive measurement configuration and keep the duration timer (e.g., T331) running, or alternatively restarting the duration timer.

It should be noted that the above behavior (e.g., C1/C2 with regard to idle/inactive measurement configurations and/or R1/R2 regarding the idle/inactive measurement results) can be configured by the network (e.g., in RRCRelease, via System Information Block (SIB) signaling, etc.) or via specified behavior in the standards.

An alternative method is for the UE to be configured with separate source and target RAT idle/inactive measurement configurations and when the UE performs inter-RAT cell reselection, it releases the source RAT measurement configurations/results and applies the target RAT idle/inactive measurement configurations.

As an alternative in the above variants, the behavior, i.e. whether to keep or release an idle/inactive measurement configuration and/or related measurements, is dependent on to what RAT, carrier, and/or cell the UE has reselected. The configuration that the UE has received can then indicate what behavior to apply for different RATs, carriers and/or cells, where different behaviors can be indicated for different RATs, carriers and/or cells. As an example, the idle/inactive measurement configuration that the UE receives in, e.g., an RRCConnectionRelease message (in LTE) may include indications that the UE shall keep the early measurement configuration and measurements if it moves to an NR carrier X whereas it shall release the early measurement configuration and measurements if it moves to another NR carrier Y.

NETWORK EMBODIMENTS

Figure 9:
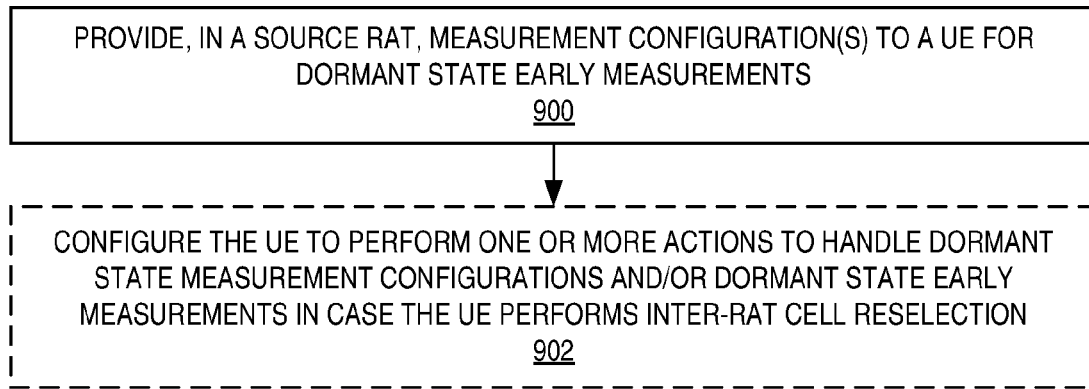
FIG. 9 is a flow chart that illustrates the operation of a base station in a source Radio Access Technology (RAT) of an inter-RAT cell reselection for a UE in accordance with some embodiments of the present disclosure.

Embodiments of a method executed by the network node (e.g., a base station 702 such as, e.g., a gNB (NR) or eNB (LTE)) for the handling of inactive/idle measurement configuration the UE applies during a dormant state (LTE/NR IDLE, LTE IDLE with suspended, LTE/NR INACTIVE), specifically when the UE performs inter-RAT cell reselection while in dormant state performing dormant state measurements, are disclosed herein. In some embodiments, as illustrated in FIG. 9, the method executed by a source RAT network node includes:
  Step 900: The network node in a source RAT provides a configuration to a UE to perform idle/inactive measurement configurations (e.g., RRCRelease, RRCConnectionRelease, system information broadcast, etc.).
    In one sub-variant, the network configures the UE with measurement configurations for cells/frequencies/beams associated with the source RAT.
    In one sub-variant, the network configures the UE with measurement configurations for cells/frequencies/beams associated with the target RAT.
    In one sub-variant, the network configures the UE with measurement configurations for cells/frequencies/beams associated with the source RAT and the target RAT.
  Step 902 (Optional): The network node configures the UE with idle/inactive measurement configurations handling in case the UE performs inter-RAT cell reselection, while in dormant state (C1). In other words, the network node configures the UE to perform one or more actions to handle dormant state measurement configurations and/or dormant state measurements in the case of inter-RAT cell reselection while in dormant state. The configuration of the one or more actions may include any one or any combination of the following:
    In one sub-variant, the network configures the UE to release the old idle/inactive measurement configurations and stop idle/inactive measurements.
    In another sub-variant, the network configures the UE to obtain full idle/inactive measurement configurations from the target RAT cell.
    In another sub-variant, the network configures the UE to keep the old idle/inactive measurement configurations.
      In one sub-variant, the network configures the UE to keep a subset of the old measurement configurations.
        This could be measurements that are relevant only while camping at the target RAT (e.g., if the cell selection was from NR to LTE, only keep measurement configurations at the cell level instead of beam level on NR frequencies after the cell reselection); and/or
        This could be a subset of the measurement configurations that are relevant to the IDLE mode (e.g., related to beam measurements and/or CSI-RS measurements, that are relevant to the INACTIVE mode but not to the IDLE mode; and/or
        This could be ancillary configuration parameters such as the validity area, idleMeasDuration, etc.
      In another sub-variant, the network configures the UE to obtain idle/inactive measurement configurations from the target RAT cell which are applied on top of the old configurations.

Figure 10:
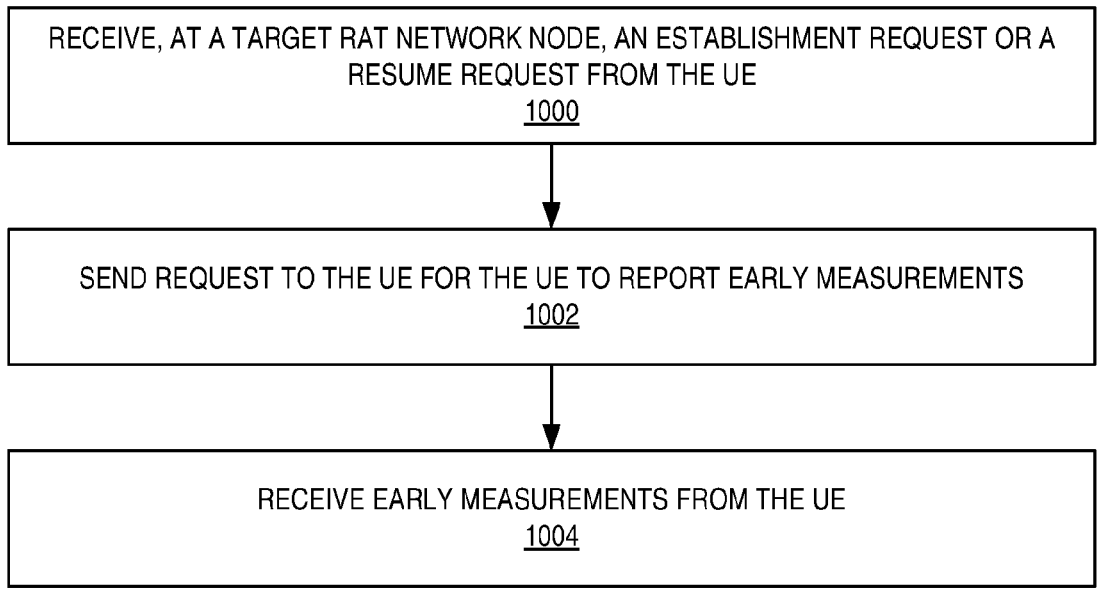
FIG. 10 is a flow chart that illustrates the operation of a base station in a target RAT of an inter-RAT cell reselection for a UE in accordance with some embodiments of the present disclosure.

In some embodiments, as illustrated in FIG. 10, the method executed by a target RAT network node includes:
  Step 1000: The target RAT network node receives an establishment or resume request from the UE in the target RAT.
  Step 1002: Upon receiving an establishment or resume request from UE, the target RAT network node sends a request to the UE that requests that the UE report early measurements. More specifically, some example variants are as follows:

In one variant, the establishment or resume requests include an indication that the UE has early measurements to report. Upon receiving the establishment or resume request including this indication, the target RAT network node sends a request to the UE to request for the UE to report early measurements.

In a sub-variant, the establishment or resume request includes separate indications for the source RAT and the target RAT measurements.

In one sub-variant, the target network node sends a request for the early measurements from the UE based on the indication from the UE for:
all early measurements available; or
only the early measurements from the RAT which the UE has indicated; or
only the early measurements from the target RAT; or
only the early measurements from the source RAT.

In another variant, the target RAT network node sends a message to the source RAT network node to request a UE context of the UE with the idle/inactive measurement configurations. These idle/inactive measurement configurations may be for the source RAT and/or the target RAT. In some embodiments, the target RAT network nodes send the request to the UE to report early measurements based on the received UE context.

In a sub-variant, the UE context only contains measurement configurations for one of the RATs (source or target RAT).

In another sub-variant, the target network node sends a request for the early measurements from the UE based on the information in the UE context received from the source node:
If the UE context contains any idle/inactive measurement configurations, the target network node requests:
all early measurements; or
early measurements associated with the source RAT; or
early measurements associated with the target RAT.
If the UE context contains any idle/inactive measurement configurations for only the source RAT or if the UE context contains any idle/inactive measurement configurations for only the target RAT, the target network node requests:
all early measurements; or
only the early measurements associated with the source RAT; or
only the early measurements associated with the target RAT.
If the UE context contain configurations for early measurements for both the source and target RAT, the target network node requests:
all early measurements; or
only the early measurements associated with the source RAT; or
only the early measurements associated with the target RAT.

In another variant, the network has no indication that the UE has early measurements to report, but the network requests the idle/inactive measurements blindly.

In another sub-variant, the target network node sends a request for the early measurements from the UE based on which RAT types can be configured and signaled in the early measurement report:
If the source RAT and the target RAT support configuring the same idle/inactive measurement configurations for both the source RAT and the target RAT and the target RAT support receiving early measurement reports for both the source RAT and the target RAT, the target network node requests:
all early measurements; or
only the early measurements associated with the source RAT; or
only the early measurements associated with the target RAT.
If the source RAT supports configuring idle/inactive measurements for both the source and target RAT, but the target RAT only supports receiving early measurements for target RAT, the target network node requests:
all early measurements; or
only the early measurements associated with the target RAT.
If the source RAT supports configuring idle/inactive measurements for only the source, but the target RAT supports receiving early measurements for both the source RAT and the target RAT, the target network node requests:
all early measurements; or
only the early measurements associated with the target RAT; or
only the early measurements associated with the source RAT.

If the target and source RAT measurement configurations are different and/or if the IDLE and INACTIVE measurement configuration are different, and the configuration of the UE was so that the UE keeps the measurements performed in the source and target RATs, then the early measurement reporting signaling is enhanced to include the measurements performed in the source and target RATs, and/or in the INACTIVE and IDLE states.

In one sub-variant, the target network node receives an indication from the UE indicating the availability of measurements belonging to the source and target RAT with a single indication.

In another sub-variant, the target network node receives an indication from the UE indicating the availability of measurements belonging to the source and target RAT using separate indications.

In another sub-variant, the target network node does not receive an indication from the UE indicating any availability of measurements, but the network can request the measurements blindly or using information about the UE configuration.

Step 1004: The target RAT network node receives dormant state measurements from the UE.

EXAMPLE REALIZATIONS

Example realizations of at least some aspects of the embodiments described above are given below.

Below are some example realizations in the 3GPP specifications where the UE, upon inter-RAT cell re-selection:
converts any current measurement configuration from the source RAT to the format of the target RAT;
converts any current measurement result from the source RAT to the format of the target RAT;

stores the value of the idle/inactive measurement timer in a variable;
starts a new timer in the target RAT with the stored value from the source RAT; and
starts performing measurements according to the target RAT.

Extensions to Technical Specification (TS) 36.331 (v15.5.0)

```
5.6.20.x    Inter-RAT cell re-selection from E-UTRA
Upon inter-RAT cell re-selection while T331 is running, the UE shall:
    1>    store the current value of the timer T331 in the variable t331eutra;
    1>    perform the procedures as specified in clause 5.x.y.z1 in TS 38.331;
    1>    stop T331;
5.6.20.y    Inter-RAT cell re-selection to E-UTRA
Upon inter-RAT cell re-selection to E-UTRA as specified in TS 38.331, the UE shall:
    1>       for each entry in measIdleInactiveCarrierListEUTRA within
       VarMeasIdleInactiveConfig as defined in TS 38.331:
        2>      store the entry in measIdleCarrierListEUTRA in VarMeasIdleConfig;
    1>       for each entry in measResultIdleListEUTRA in VarMeasIdleReport defined in TS
       38.331:
        2>      store the entry in measResultIdleListEUTRA in VarMeasIdleReport;
    1>       for each entry in measIdleInactiveCarrierListNR within VarMeasIdleInactiveConfig
       as defined in TS 38.331:
        2>      store the entry in measIdleCarrierListNR in VarMeasIdleConfig;
    1>       for each entry in measResultIdleListNR in VarMeasIdleReport defined in TS
       38.331:
        2>      store the entry in measResultIdleListNR in VarMeasIdleReport;
    1>    start the timer T331 with value t331nr as defined in TS 38.331;
    1>    start performing idle mode measurements as specified in 5.6.20;
```

In the example above, the value of the timer (e.g., T331) is stored in a new UE variable, but the specifications could, e.g., refer directly to the previously stored value.

Extensions to TS 38.331 (v15.5.0)

In NR (3GPP TS 38.331), a similar procedure could be introduced:

```
5.x.y.z       Inter-RAT cell re-selection from NR
Upon inter-RAT cell re-selection while T331 is running, the UE shall:
    1>    store the current value of the timer T331 in the variable t331nr;
    1>    perform the procedures as specified in clause 5.6.20 in TS 36.331;
    1>    stop T331;
5.x.y.z1      Inter-RAT cell re-selection to NR
Upon inter-RAT cell re-selection to NR as specified in TS 36.331, the UE shall:
    1>       for each entry in measIdleCarrierListEUTRA within VarMeasIdleConfig as defined
       in TS 36.331:
        2>       store the entry in measIdleInactiveCarrierListEUTRA in
            VarMeasIdleInactiveConfig;
    1>       for each entry in measResultIdleListEUTRA in VarMeasIdleReport defined in TS
       36.331:
        2>       store the entry in measResultIdleListEUTRA in VarMeasIdleReport;
    1>       for each entry in measIdleCarrierListNR within VarMeasIdleConfig as defined in
       TS 36.331:
        2>       store the entry in measIdleInactiveCarrierListNR in
            VarMeasIdleInactiveConfig;
    1>    start the timer T331 with value t331eutra as defined in TS 36.331;
    1>       for each entry in measResultIdleListNR in VarMeasIdleReport defined in TS
       36.331:
        2>       store the entry in measResultIdleListNR in VarMeasIdleReport;
    1>    start performing idle mode measurements as specified in 5.x.x;
```

In the example above, the value of the timer (e.g., T331) is stored in a new UE variable, but the specifications could, e.g., refer directly to the previously stored value.

Additional Aspects

Figure 11:
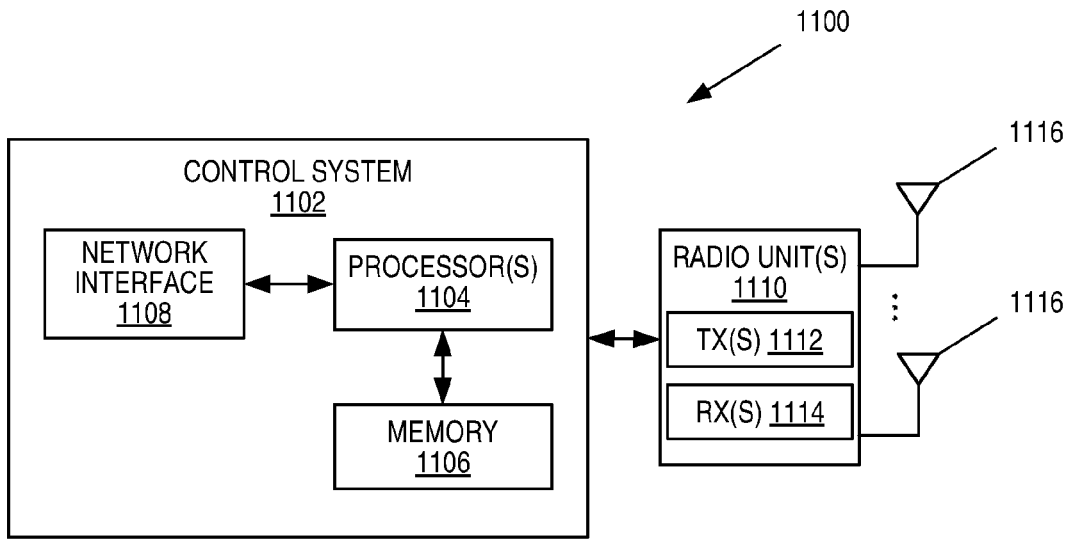
FIGS. 11 through 13 are schematic block diagrams of example embodiments of a radio access node, such as a base station.

FIG. 11 is a schematic block diagram of a radio access node 1100 according to some embodiments of the present disclosure. The radio access node 1100 may be, for example, a base station 702 or 706. As illustrated, the radio access node 1100 includes a control system 1102 that includes one or more processors 1104 (e.g., Central Processing Units (CPUs), Application Specific Integrated Circuits (ASICs), Field Programmable Gate Arrays (FPGAs), and/or the like), memory 1106, and a network interface 1108. The one or more processors 1104 are also referred to herein as processing circuitry. In addition, the radio access node 1100 includes one or more radio units 1110 that each includes one or more transmitters 1112 and one or more receivers 1114 coupled to one or more antennas 1116. The radio units 1110 may be referred to or be part of radio interface circuitry. In some embodiments, the radio unit(s) 1110 is external to the control system 1102 and connected to the control system 1102 via, e.g., a wired connection (e.g., an optical cable). However, in some other embodiments, the radio unit(s) 1110 and potentially the antenna(s) 1116 are integrated together with the control system 1102. The one or more processors 1104 operate to provide one or more functions of a radio access node 1100 (e.g., one or more functions of a network node described herein, e.g., in the "Network Embodiments" section) as described herein. In some embodiments, the function(s) are implemented in software that is stored, e.g., in the memory 1106 and executed by the one or more processors 1104.

Figure 12:
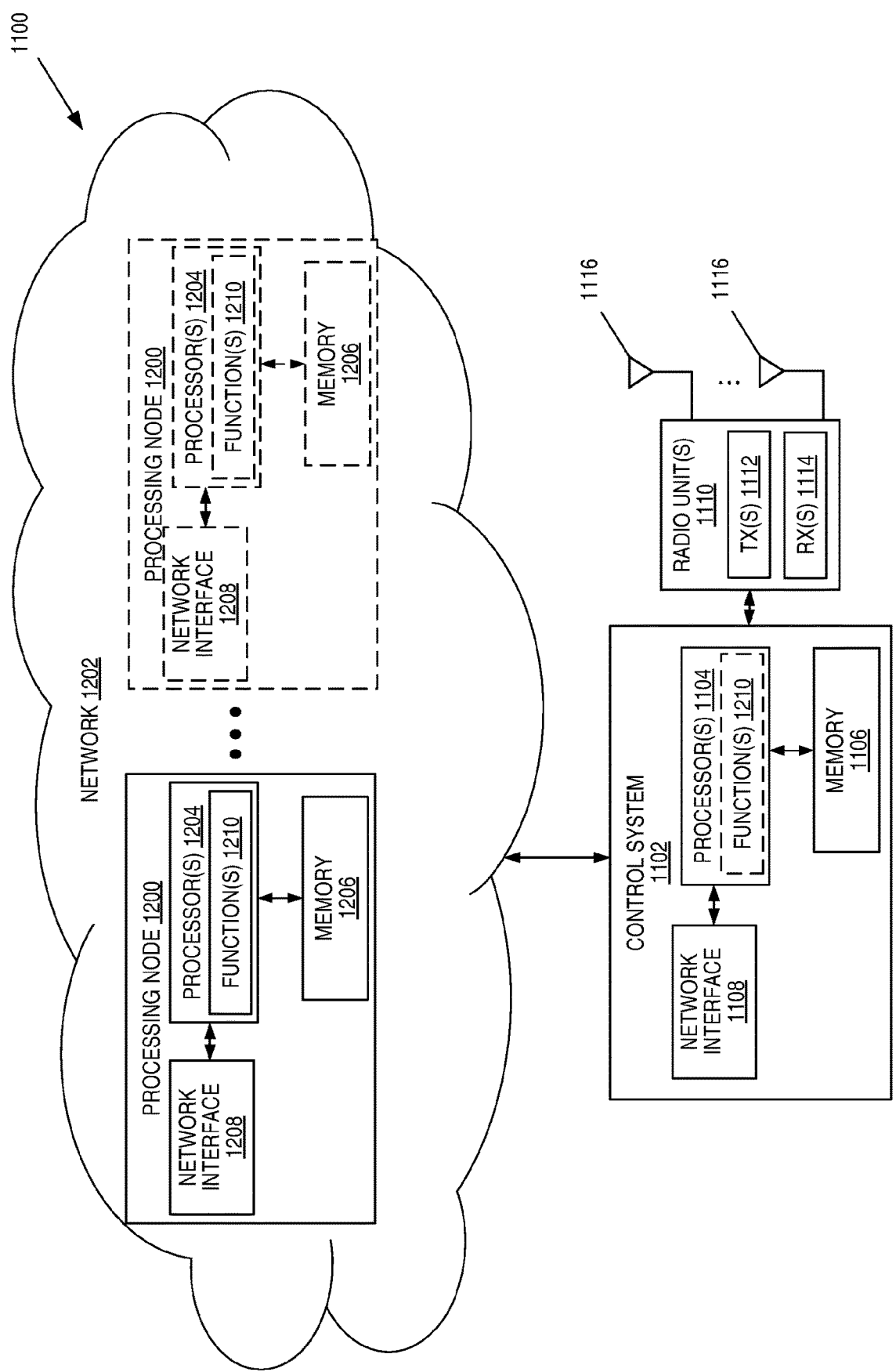

FIG. 12 is a schematic block diagram that illustrates a virtualized embodiment of the radio access node 1100 according to some embodiments of the present disclosure. This discussion is equally applicable to other types of network nodes. Further, other types of network nodes may have similar virtualized architectures.

As used herein, a "virtualized" radio access node is an implementation of the radio access node 1100 in which at least a portion of the functionality of the radio access node 1100 is implemented as a virtual component(s) (e.g., via a virtual machine(s) executing on a physical processing node(s) in a network(s)). As illustrated, in this example, the radio access node 1100 includes the control system 1102 that includes the one or more processors 1104 (e.g., CPUs, ASICs, FPGAs, and/or the like), the memory 1106, and the network interface 1108 and the one or more radio units 1110 that each includes the one or more transmitters 1112 and the one or more receivers 1114 coupled to the one or more antennas 1116, as described above. The control system 1102 is connected to the radio unit(s) 1110 via, for example, an optical cable or the like. The control system 1102 is connected to one or more processing nodes 1200 coupled to or included as part of a network(s) 1202 via the network interface 1108. Each processing node 1200 includes one or more processors 1204 (e.g., CPUs, ASICs, FPGAs, and/or the like), memory 1206, and a network interface 1208.

In this example, functions 1210 of the radio access node 1100 described herein (e.g., one or more functions of a network node described herein, e.g., in the "Network Embodiments" section) are implemented at the one or more processing nodes 1200 or distributed across the control system 1102 and the one or more processing nodes 1200 in any desired manner. In some particular embodiments, some or all of the functions 1210 of the radio access node 1100 described herein (e.g., one or more functions of a network node described herein, e.g., in the "Network Embodiments" section) are implemented as virtual components executed by one or more virtual machines implemented in a virtual environment(s) hosted by the processing node(s) 1200. As will be appreciated by one of ordinary skill in the art, additional signaling or communication between the processing node(s) 1200 and the control system 1102 is used in order to carry out at least some of the desired functions 1210. Notably, in some embodiments, the control system 1102 may not be included, in which case the radio unit(s) 1110 communicate directly with the processing node(s) 1200 via an appropriate network interface(s).

In some embodiments, a computer program including instructions which, when executed by at least one processor, causes the at least one processor to carry out the functionality of radio access node 1100 (e.g., one or more functions of a network node described herein, e.g., in the "Network Embodiments" section) or a node (e.g., a processing node 1200) implementing one or more of the functions 1210 of the radio access node 1100 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 13:
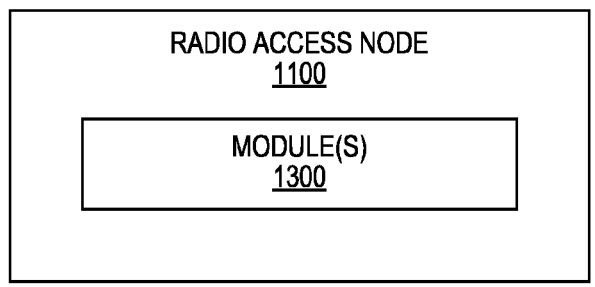

FIG. 13 is a schematic block diagram of the radio access node 1100 according to some other embodiments of the present disclosure. The radio access node 1100 includes one or more modules 1300, each of which is implemented in software. The module(s) 1300 provide the functionality of the radio access node 1100 described herein (e.g., one or more functions of a network node described herein, e.g., in the "Network Embodiments" section). This discussion is equally applicable to the processing node 1200 of FIG. 12 where the modules 1300 may be implemented at one of the processing nodes 1200 or distributed across multiple processing nodes 1200 and/or distributed across the processing node(s) 1200 and the control system 1102.

Figure 14:
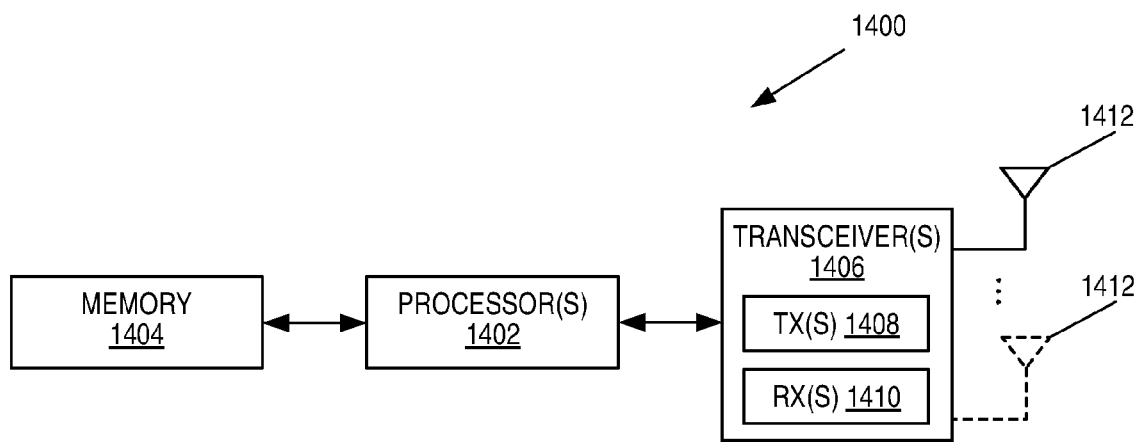
FIGS. 14 and 15 are schematic block diagrams of example embodiments of a UE.

FIG. 14 is a schematic block diagram of a UE 1400 according to some embodiments of the present disclosure. As illustrated, the UE 1400 includes one or more processors 1402 (e.g., CPUs, ASICs, FPGAs, and/or the like), memory 1404, and one or more transceivers 1406 each including one or more transmitters 1408 and one or more receivers 1410 coupled to one or more antennas 1412. The transceiver(s) 1406 includes radio-front end circuitry connected to the antenna(s) 1412 that is configured to condition signals communicated between the antenna(s) 1412 and the processor(s) 1402, as will be appreciated by on of ordinary skill in the art. The processors 1402 are also referred to herein as processing circuitry. The transceivers 1406 are also referred to herein as radio circuitry. In some embodiments, the functionality of the UE 1400 described above (e.g., one or more functions of a network node described herein, e.g., in the "UE Embodiments" section) may be fully or partially implemented in software that is, e.g., stored in the memory 1404 and executed by the processor(s) 1402. Note that the UE 1400 may include additional components not illustrated in FIG. 14 such as, e.g., one or more user interface components (e.g., an input/output interface including a display, buttons, a touch screen, a microphone, a speaker(s), and/or the like and/or any other components for allowing input of information into the UE 1400 and/or allowing output of information from the UE 1400), a power supply (e.g., a battery and associated power circuitry), etc.

In some embodiments, a computer program including instructions which, when executed by at least one processor, causes the at least one processor to carry out the functionality of the UE 1400 according to any of the embodiments described herein (e.g., one or more functions of a network node described herein, e.g., in the "UE Embodiments" section) is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 15:
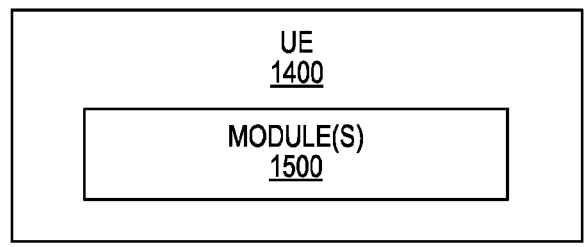

FIG. 15 is a schematic block diagram of the UE 1400 according to some other embodiments of the present disclosure. The UE 1400 includes one or more modules 1500, each of which is implemented in software. The module(s) 1500 provide the functionality of the UE 1400 described herein (e.g., one or more functions of a network node described herein, e.g., in the "UE Embodiments" section).

Figure 16:
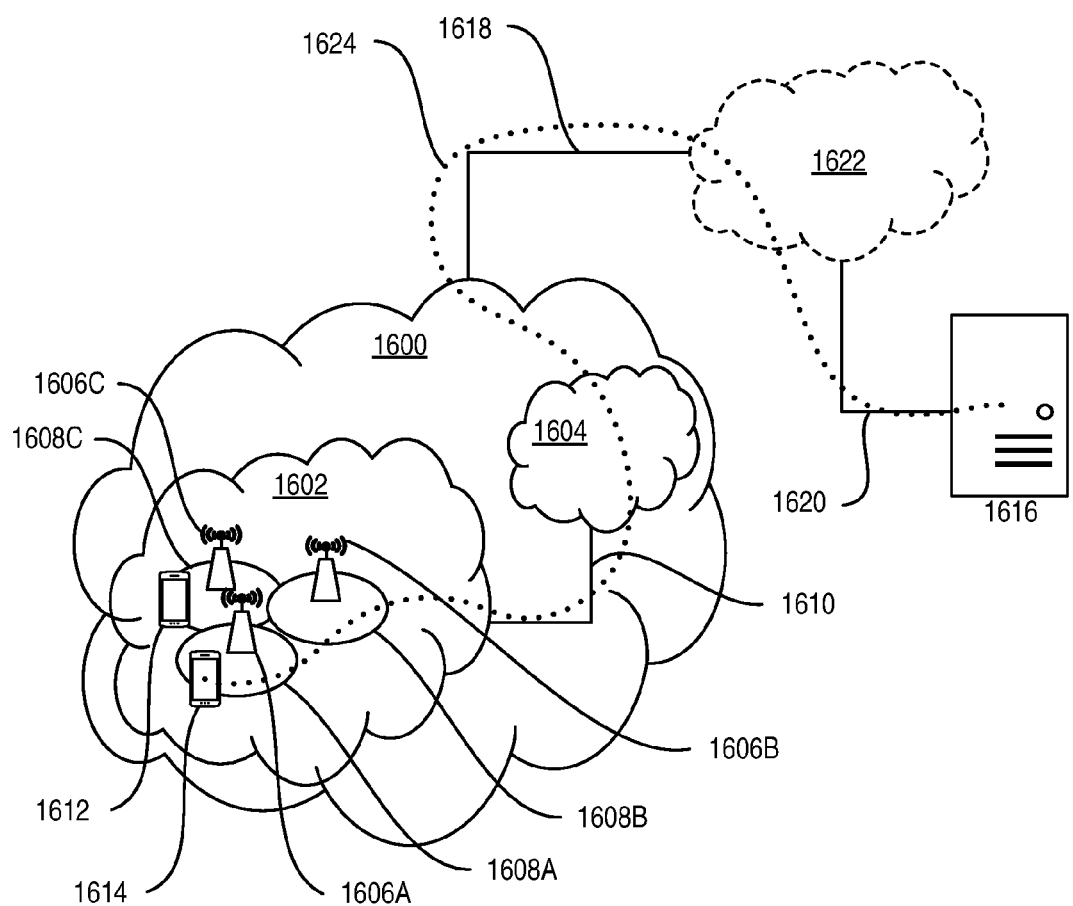
FIG. 16 illustrates another example of a system in which embodiments of the present disclosure may be implemented.

With reference to FIG. 16, in accordance with an embodiment, a communication system includes a telecommunication network 1600, such as a 3GPP-type cellular network, which comprises an access network 1602, such as a RAN, and a core network 1604. The access network 1602 comprises a plurality of base stations 1606A, 1606B, 1606C, such as Node Bs, eNBs, gNBs, or other types of wireless Access Points (APs), each defining a corresponding coverage area 1608A, 1608B, 1608C. Each base station 1606A, 1606B, 1606C is connectable to the core network 1604 over a wired or wireless connection 1610. A first UE 1612 located in coverage area 1608C is configured to wirelessly connect to, or be paged by, the corresponding base station 1606C. A second UE 1614 in coverage area 1608A is wirelessly connectable to the corresponding base station 1606A. While a plurality of UEs 1612, 1614 are illustrated in this example, the disclosed embodiments are equally applicable to a situation where a sole UE is in the coverage area or where a sole UE is connecting to the corresponding base station 1606.

The telecommunication network 1600 is itself connected to a host computer 1616, which may be embodied in the hardware and/or software of a standalone server, a cloud-implemented server, a distributed server, or as processing resources in a server farm. The host computer 1616 may be under the ownership or control of a service provider, or may be operated by the service provider or on behalf of the service provider. Connections 1618 and 1620 between the telecommunication network 1600 and the host computer 1616 may extend directly from the core network 1604 to the host computer 1616 or may go via an optional intermediate network 1622. The intermediate network 1622 may be one of, or a combination of more than one of, a public, private, or hosted network; the intermediate network 1622, if any, may be a backbone network or the Internet; in particular, the intermediate network 1622 may comprise two or more sub-networks (not shown).

The communication system of FIG. 16 as a whole enables connectivity between the connected UEs 1612, 1614 and the host computer 1616. The connectivity may be described as an Over-the-Top (OTT) connection 1624. The host computer 1616 and the connected UEs 1612, 1614 are configured to communicate data and/or signaling via the OTT connection 1624, using the access network 1602, the core network 1604, any intermediate network 1622, and possible further infrastructure (not shown) as intermediaries. The OTT connection 1624 may be transparent in the sense that the participating communication devices through which the OTT connection 1624 passes are unaware of routing of uplink and downlink communications. For example, the base station 1606 may not or need not be informed about the past routing of an incoming downlink communication with data originating from the host computer 1616 to be forwarded (e.g., handed over) to a connected UE 1612. Similarly, the base station 1606 need not be aware of the future routing of an outgoing uplink communication originating from the UE 1612 towards the host computer 1616.

Example implementations, in accordance with an embodiment, of the UE, base station, and host computer discussed in the preceding paragraphs will now be described with reference to FIG. 17. In a communication system 1700, a host computer 1702 comprises hardware 1704 including a communication interface 1706 configured to set up and maintain a wired or wireless connection with an interface of a different communication device of the communication system 1700. The host computer 1702 further comprises processing circuitry 1708, which may have storage and/or processing capabilities. In particular, the processing circuitry 1708 may comprise one or more programmable processors, ASICs, FPGAs, or combinations of these (not shown) adapted to execute instructions. The host computer 1702 further comprises software 1710, which is stored in or accessible by the host computer 1702 and executable by the processing circuitry 1708. The software 1710 includes a host application 1712. The host application 1712 may be operable to provide a service to a remote user, such as a UE 1714 connecting via an OTT connection 1716 terminating at the UE 1714 and the host computer 1702. In providing the service to the remote user, the host application 1712 may provide user data which is transmitted using the OTT connection 1716.

The communication system 1700 further includes a base station 1718 provided in a telecommunication system and comprising hardware 1720 enabling it to communicate with the host computer 1702 and with the UE 1714. The hardware 1720 may include a communication interface 1722 for setting up and maintaining a wired or wireless connection with an interface of a different communication device of the communication system 1700, as well as a radio interface 1724 for setting up and maintaining at least a wireless connection 1726 with the UE 1714 located in a coverage area (not shown in FIG. 17) served by the base station 1718. The communication interface 1722 may be configured to facilitate a connection 1728 to the host computer 1702. The connection 1728 may be direct or it may pass through a core network (not shown in FIG. 17) of the telecommunication system and/or through one or more intermediate networks outside the telecommunication system. In the embodiment shown, the hardware 1720 of the base station 1718 further includes processing circuitry 1730, which may comprise one or more programmable processors, ASICs, FPGAs, or combinations of these (not shown) adapted to execute instructions. The base station 1718 further has software 1732 stored internally or accessible via an external connection.

The communication system 1700 further includes the UE 1714 already referred to. The UE's 1714 hardware 1734 may include a radio interface 1736 configured to set up and maintain a wireless connection 1726 with a base station serving a coverage area in which the UE 1714 is currently located. The hardware 1734 of the UE 1714 further includes processing circuitry 1738, which may comprise one or more programmable processors, ASICs, FPGAs, or combinations of these (not shown) adapted to execute instructions. The UE 1714 further comprises software 1740, which is stored in or accessible by the UE 1714 and executable by the processing circuitry 1738. The software 1740 includes a client application 1742. The client application 1742 may be operable to provide a service to a human or non-human user via the UE 1714, with the support of the host computer 1702. In the host computer 1702, the executing host application 1712 may communicate with the executing client application 1742 via the OTT connection 1716 terminating at the UE 1714 and the host computer 1702. In providing the service to the user, the client application 1742 may receive request data from the host application 1712 and provide user data in response to the request data. The OTT connection 1716 may transfer both the request data and the user data. The client application 1742 may interact with the user to generate the user data that it provides.

Figure 17:
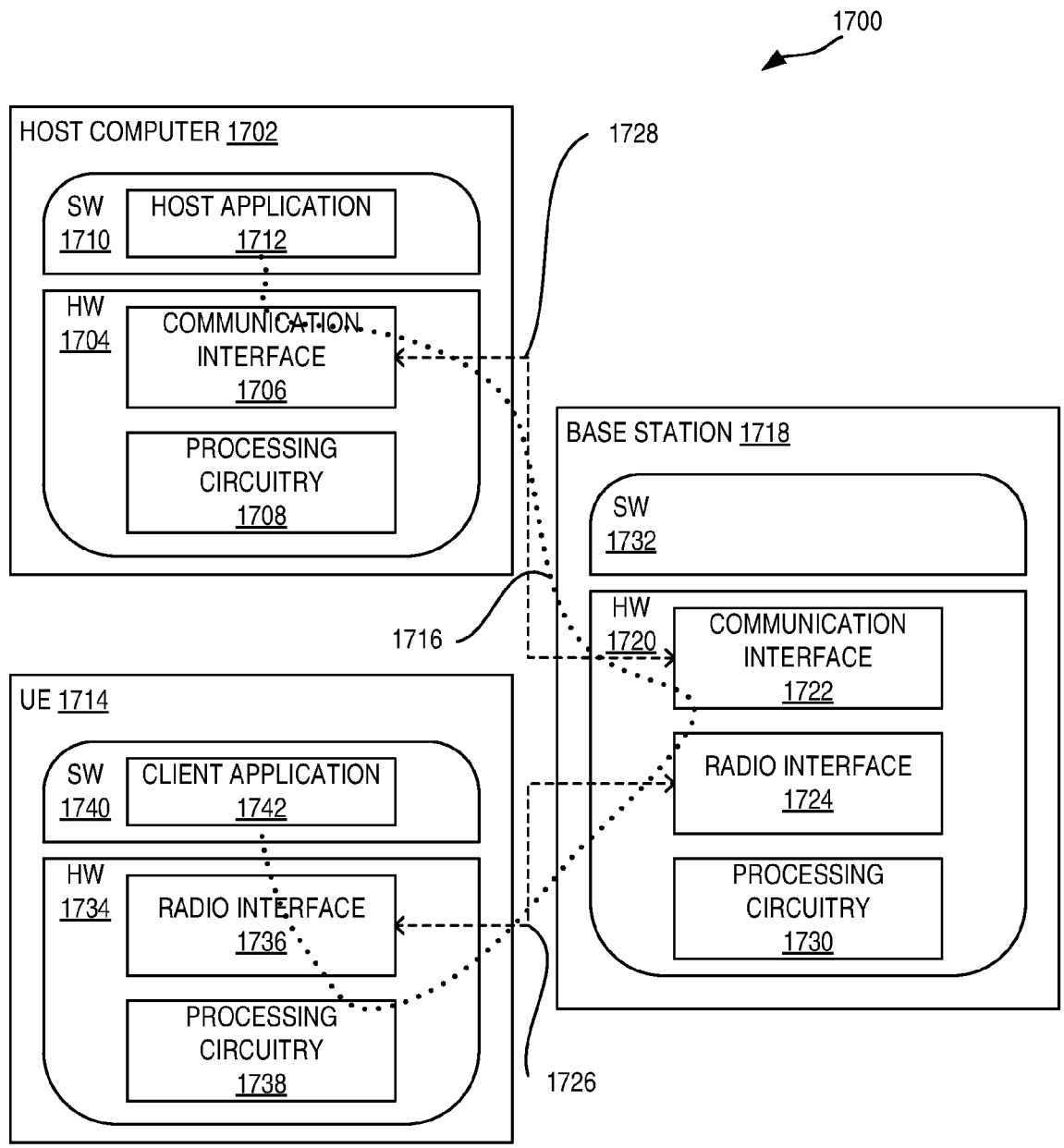
FIG. 17 illustrate example embodiments of the host computer, base station, and UE in the system of FIG. 16.

It is noted that the host computer 1702, the base station 1718, and the UE 1714 illustrated in FIG. 17 may be similar or identical to the host computer 1616, one of the base stations 1606A, 1606B, 1606C, and one of the UEs 1612, 1614 of FIG. 16, respectively. This is to say, the inner workings of these entities may be as shown in FIG. 17 and independently, the surrounding network topology may be that of FIG. 16.

In FIG. 17, the OTT connection 1716 has been drawn abstractly to illustrate the communication between the host computer 1702 and the UE 1714 via the base station 1718 without explicit reference to any intermediary devices and the precise routing of messages via these devices. The network infrastructure may determine the routing, which may be configured to hide from the UE 1714 or from the service provider operating the host computer 1702, or both. While the OTT connection 1716 is active, the network infrastructure may further take decisions by which it dynamically changes the routing (e.g., on the basis of load balancing consideration or reconfiguration of the network).

The wireless connection 1726 between the UE 1714 and the base station 1718 is in accordance with the teachings of the embodiments described throughout this disclosure. One or more of the various embodiments improve the performance of OTT services provided to the UE 1714 using the OTT connection 1716, in which the wireless connection 1726 forms the last segment.

A measurement procedure may be provided for the purpose of monitoring data rate, latency, and other factors on which the one or more embodiments improve. There may further be an optional network functionality for reconfiguring the OTT connection 1716 between the host computer 1702 and the UE 1714, in response to variations in the measurement results. The measurement procedure and/or the network functionality for reconfiguring the OTT connection 1716 may be implemented in the software 1710 and the hardware 1704 of the host computer 1702 or in the software 1740 and the hardware 1734 of the UE 1714, or both. In some embodiments, sensors (not shown) may be deployed in or in association with communication devices through which the OTT connection 1716 passes; the sensors may participate in the measurement procedure by supplying values of the monitored quantities exemplified above, or supplying values of other physical quantities from which the software 1710, 1740 may compute or estimate the monitored quantities. The reconfiguring of the OTT connection 1716 may include message format, retransmission settings, preferred routing, etc.; the reconfiguring need not affect the base station 1718, and it may be unknown or imperceptible to the base station 1718. Such procedures and functionalities may be known and practiced in the art. In certain embodiments, measurements may involve proprietary UE signaling facilitating the host computer 1702's measurements of throughput, propagation times, latency, and the like. The measurements may be implemented in that the software 1710 and 1740 causes messages to be transmitted, in particular empty or 'dummy' messages, using the OTT connection 1716 while it monitors propagation times, errors, etc.

Figures 18, 19:
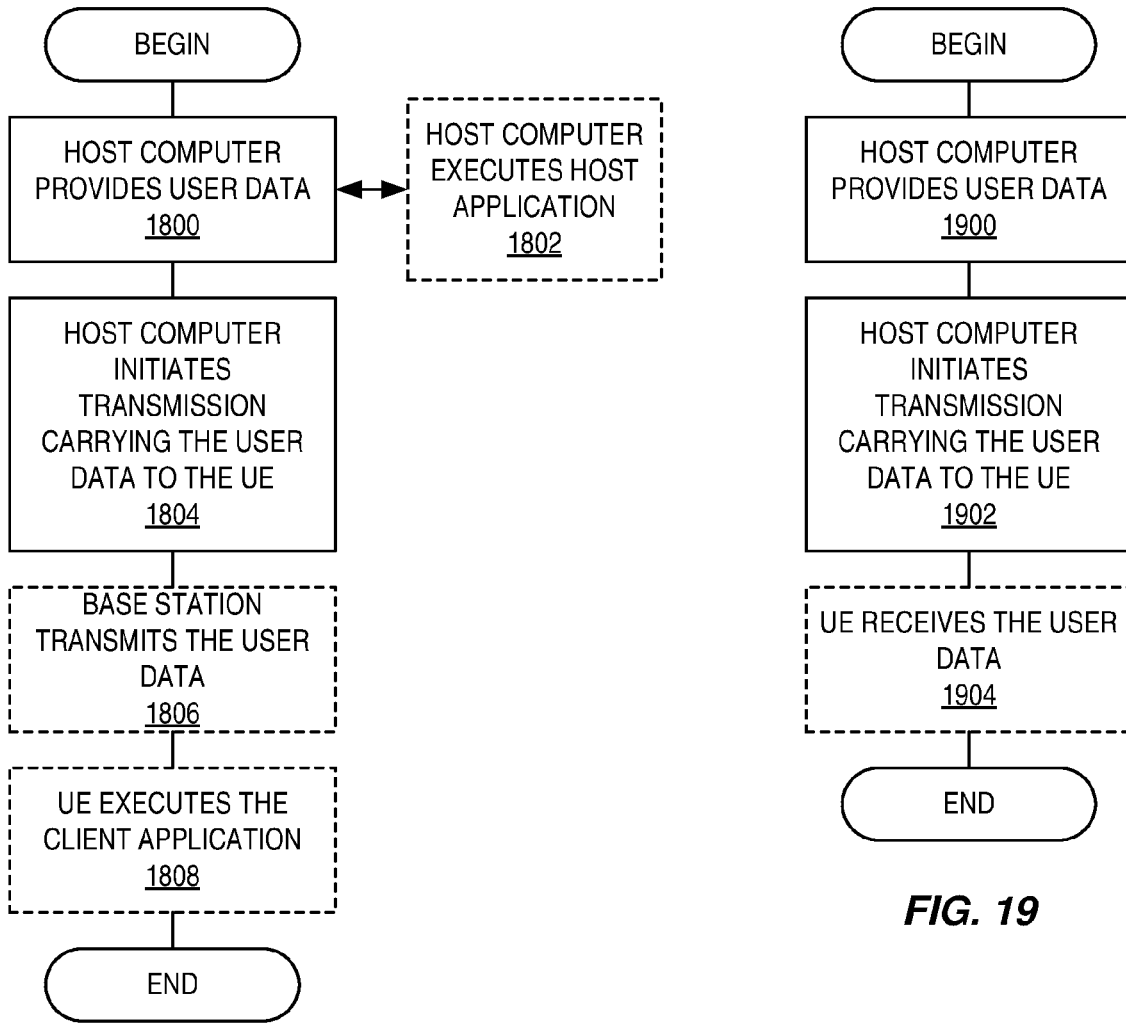
FIGS. 18 through 21 are flowcharts illustrating method implemented in a communication system, in accordance with some embodiments of the present disclosure.

FIG. 18 is a flowchart illustrating a method implemented in a communication system, in accordance with one embodiment. The communication system includes a host computer, a base station, and a UE which may be those described with reference to FIGS. 16 and 17. For simplicity of the present disclosure, only drawing references to FIG. 18 will be included in this section. In step 1800, the host computer provides user data. In sub-step 1802 (which may be optional) of step 1800, the host computer provides the user data by executing a host application. In step 1804, the host computer initiates a transmission carrying the user data to the UE. In step 1806 (which may be optional), the base station transmits to the UE the user data which was carried in the transmission that the host computer initiated, in accordance with the teachings of the embodiments described throughout this disclosure. In step 1808 (which may also be optional), the UE executes a client application associated with the host application executed by the host computer.

FIG. 19 is a flowchart illustrating a method implemented in a communication system, in accordance with one embodiment. The communication system includes a host computer, a base station, and a UE which may be those described with reference to FIGS. 16 and 17. For simplicity of the present disclosure, only drawing references to FIG. 19 will be included in this section. In step 1900 of the method, the host computer provides user data. In an optional sub-step (not shown) the host computer provides the user data by executing a host application. In step 1902, the host computer initiates a transmission carrying the user data to the UE. The transmission may pass via the base station, in accordance with the teachings of the embodiments described throughout this disclosure. In step 1904 (which may be optional), the UE receives the user data carried in the transmission.

Figures 20, 21:
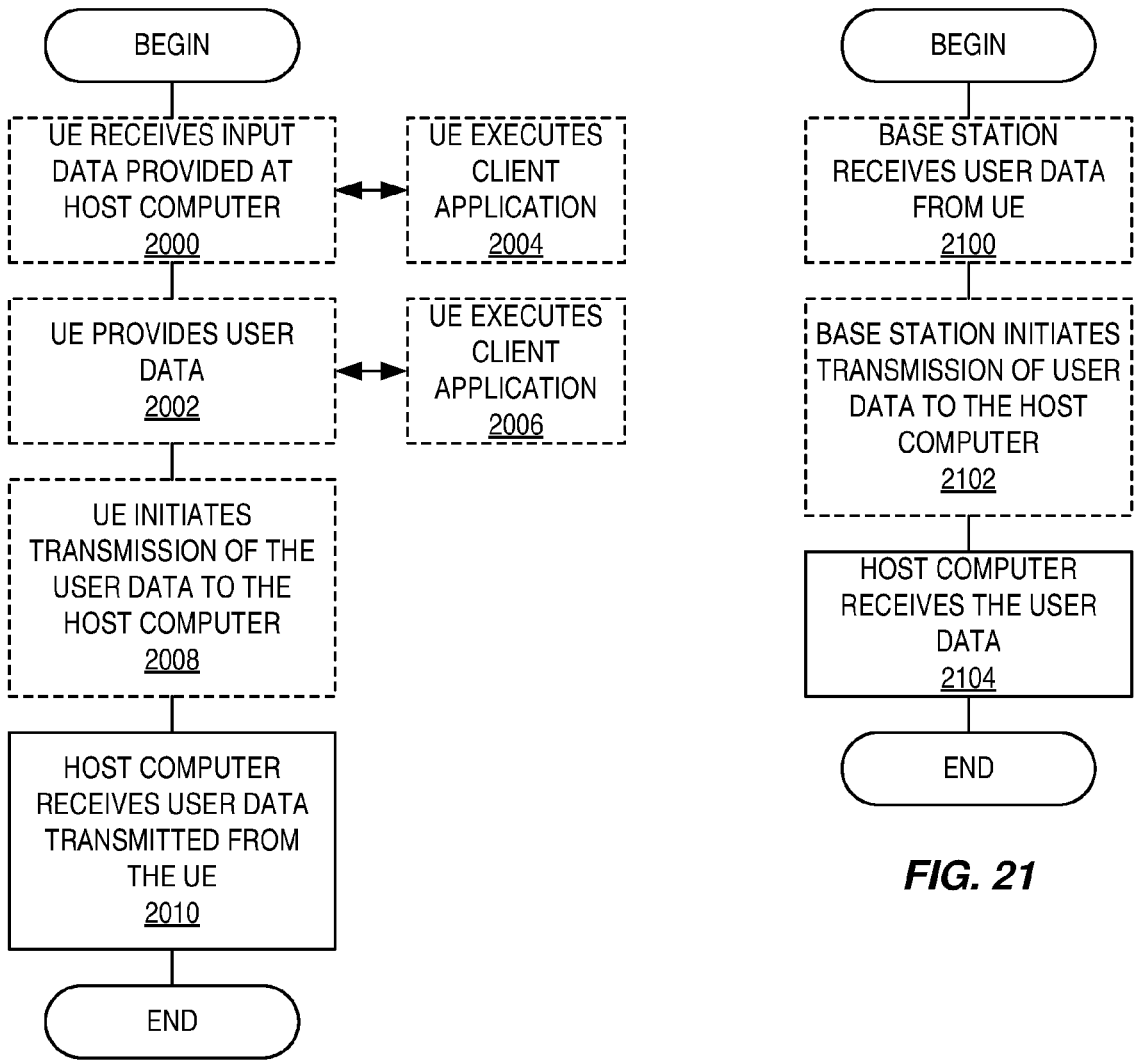

FIG. 20 is a flowchart illustrating a method implemented in a communication system, in accordance with one embodiment. The communication system includes a host computer, a base station, and a UE which may be those described with reference to FIGS. 16 and 17. For simplicity of the present disclosure, only drawing references to FIG. 20 will be included in this section. In step 2000 (which may be optional), the UE receives input data provided by the host computer. Additionally or alternatively, in step 2002, the UE provides user data. In sub-step 2004 (which may be optional) of step 2000, the UE provides the user data by executing a client application. In sub-step 2006 (which may be optional) of step 2002, the UE executes a client application which provides the user data in reaction to the received input data provided by the host computer. In providing the user data, the executed client application may further consider user input received from the user. Regardless of the specific manner in which the user data was provided, the UE initiates, in sub-step 2008 (which may be optional), transmission of the user data to the host computer. In step 2010 of the method, the host computer receives the user data transmitted from the UE, in accordance with the teachings of the embodiments described throughout this disclosure.

FIG. 21 is a flowchart illustrating a method implemented in a communication system, in accordance with one embodiment. The communication system includes a host computer, a base station, and a UE which may be those described with reference to FIGS. 16 and 17. For simplicity of the present disclosure, only drawing references to FIG. 21 will be included in this section. In step 2100 (which may be optional), in accordance with the teachings of the embodiments described throughout this disclosure, the base station receives user data from the UE. In step 2102 (which may be optional), the base station initiates transmission of the received user data to the host computer. In step 2104 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

Some example embodiments of the present disclosure are as follows.

GROUP A EMBODIMENTS

Embodiment 1: A method performed by a wireless device, the method comprising one or more of: receiving (800), from a source RAT network node, one or more measurement configurations for dormant state (e.g., IDLE state, INACTIVE state) early measurements; performing (804), in a first dormant state, early measurements in accordance with at least one of the one or more measurement configurations; performing (808) an inter-RAT cell reselection to a target RAT while in the first dormant state; and, upon performing the inter-RAT cell reselection to the target RAT while in the first dormant state, performing (810) one or more actions to handle dormant state measurement configurations and/or dormant state early measurements.

Embodiment 2: The method of embodiment 1 wherein the one or more measurement configurations received from the source RAT network node, comprise:
  one or more measurement configurations for measuring on cells, frequencies, and/or beams associated with the source RAT;
  one or more measurement configurations for measuring on cells, frequencies, and/or beams associated with the target RAT; or
  one or more measurement configurations for measuring on cells, frequencies, and/or beams associated with the source RAT and the target RAT.

Embodiment 3: The method of embodiment 1 or 2 wherein the one or more actions comprise any one or combination of the following actions:
  remaining in the first dormant state in the target RAT;
  transitioning to a second dormant state in the target RAT;
  stop performing early measurement according to one or more source RAT measurement configurations, the one or more source RAT measurement configurations being comprised in the one or more measurement configurations for dormant state early measurements received from the source RAT network node;
  start performing early measurements according to one or more target RAT measurement configurations for dormant state early measurements;
  stop performing early measurements;
  keep performing early measurements according to the one or more measurement configurations;
  keep a subset of the one or more measurement configurations and keep performing early measurements in accordance with the subset of the one or more measurement configurations;
  applying one or more measurement configurations for the target RAT on top of the one or more measurement configurations and perform early measurements in accordance with the resulting measurement configurations;
  releasing current early measurements performed according to the one or more measurement configurations;
  keeping the current early measurements;
  keeping the current early measurements only if handling of measurement configurations is such that the current measurement configurations are kept;
  keeping the current early measurements only if handling of measurement configurations is such that the current measurement configurations are kept and an associated timer is not restarted;
  releasing a subset of the early measurements (e.g., those related to the first dormant state but not a second dormant state);
  releasing a subset of the early measurements that are relevant to the source RAT but not the target RAT;
  converting at least some of the early measurements to a format that is suitable for the second RAT.

Embodiment 4: The method of any one of embodiments 1 to 3 wherein at least one of the one or more actions is configured by the source RAT network node.

Embodiment 5: The method of any one of embodiments 1 to 4 further comprising reporting the early measurements to a target RAT network node.

Embodiment 6: The method of any of the previous embodiments, further comprising: providing user data; and forwarding the user data to a host computer via the transmission to the base station.

GROUP B EMBODIMENTS

Embodiment 7: A method performed by a base station in a source RAT, the method comprising: providing (900), to a UE in the source RAT, one or more measurement configurations for dormant state (e.g., IDLE state, INACTIVE state) early measurements; and providing (902), to the UE, information that indicates one or more actions to be performed by the UE upon inter-RAT cell reselection to a target RAT while in a dormant state.

Embodiment 8: The method of embodiment 7 wherein the one or more measurement configurations provided to the UE comprise:
  one or more measurement configurations for measuring on cells, frequencies, and/or beams associated with the source RAT;
  one or more measurement configurations for measuring on cells, frequencies, and/or beams associated with the target RAT; or
  one or more measurement configurations for measuring on cells, frequencies, and/or beams associated with the source RAT and the target RAT.

Embodiment 9: The method of embodiment 7 or 8 wherein the one or more actions comprise any one or combination of the following actions:
  remaining in a first dormant state in the target RAT;
  transitioning to a second dormant state in the target RAT;
  stop performing early measurement according to one or more source RAT measurement configurations, the one or more source RAT measurement configurations being comprised in the one or more measurement configurations for dormant state early measurements received from the source RAT network node;
  start performing early measurements according to one or more target RAT measurement configurations for dormant state early measurements;
  stop performing early measurements;
  keep performing early measurements according to the one or more measurement configurations;

keep a subset of the one or more measurement configurations and keep performing early measurements in accordance with the subset of the one or more measurement configurations;

applying one or more measurement configurations for the target RAT on top of the one or more measurement configurations and perform early measurements in accordance with the resulting measurement configurations;

releasing current early measurements performed according to the one or more measurement configurations;

keeping the current early measurements;

keeping the current early measurements only if handling of measurement configurations is such that the current measurement configurations are kept;

keeping the current early measurements only if handling of measurement configurations is such that the current measurement configurations are kept and an associated timer is not restarted;

releasing a subset of the early measurements (e.g., those related to the first dormant state but not a second dormant state);

releasing a subset of the early measurements that are relevant to the source RAT but not the target RAT;

converting at least some of the early measurements to a format that is suitable for the second RAT.

Embodiment 10: A method performed by a base station in a target RAT of an inter-RAT cell reselection of a UE, the method comprising: receiving (1000), from the UE, an establishment request or a resume request after an inter-RAT cell reselection from a source RAT to the target RAT; sending (1002), to the UE, a request for the UE to report early measurements (i.e., dormant state measurements); and receiving (1004), from the UE, one or more early measurements.

Embodiment 11: The method of embodiment 10 wherein the establishment request or resume request comprises an indication that the UE has early measurements to report.

Embodiment 12: The method of embodiment 10 wherein the establishment request or resume request comprises a first indication that the UE has early measurements to report for the source RAT and a second indication that the UE has early measurements to report for the target RAT.

Embodiment 13: The method of embodiment 10 wherein the request for the UE to report early measurements requests early measurements for the source RAT if the establishment request or resume request comprises a first indication that the UE has early measurements to report for the source RAT and requests early measurements for the target RAT if the establishment request or resume request comprises a second indication that the UE has early measurements to report for the source RAT.

Embodiment 14: The method of embodiment 10 wherein the request for the UE to report early measurements requests early measurements for: both the source RAT and the target RAT; only the source RAT; only the target RAT; or only from the RAT from which the UE has indicated that early measurements are available.

Embodiment 15: The method of embodiment 10 further comprising obtaining a UE context of the UE from a source RAT network node, wherein the UE context comprises: information regarding measurement configurations for the UE for the source RAT; information regarding measurement configurations for the UE for the target RAT; or information regarding measurement configurations for the UE for both the source RAT and the second RAT.

Embodiment 16: The method of embodiment 15 wherein the request is based on the UE context of the UE.

Embodiment 17: The method of embodiment 10 wherein sending (1002) the request to the UE comprises sending the request to the UE blindly.

Embodiment 18: The method of embodiment 10 wherein sending (1002) the request to the UE comprises sending the request to the UE based on which RAT types can be configured and signaled in the early measurement report.

Embodiment 19: The method of any of the previous embodiments, further comprising: obtaining user data; and forwarding the user data to a host computer or a

GROUP C EMBODIMENTS

Embodiment 20: A wireless device comprising: processing circuitry configured to perform any of the steps of any of the Group A embodiments; and power supply circuitry configured to supply power to the wireless device.

Embodiment 21: A base station comprising: processing circuitry configured to perform any of the steps of any of the Group B embodiments; and power supply circuitry configured to supply power to the base station.

Embodiment 22: A User Equipment, UE, comprising: an antenna configured to send and receive wireless signals; radio front-end circuitry connected to the antenna and to processing circuitry, and configured to condition signals communicated between the antenna and the processing circuitry; the processing circuitry being configured to perform any of the steps of any of the Group A embodiments; an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE.

Embodiment 23: A communication system including a host computer comprising: processing circuitry configured to provide user data; and a communication interface configured to forward the user data to a cellular network for transmission to a User Equipment, UE; wherein the cellular network comprises a base station having a radio interface and processing circuitry, the base station's processing circuitry configured to perform any of the steps of any of the Group B embodiments.

Embodiment 24: The communication system of the previous embodiment further including the base station.

Embodiment 25: The communication system of the previous 2 embodiments, further including the UE, wherein the UE is configured to communicate with the base station.

Embodiment 26: The communication system of the previous 3 embodiments, wherein: the processing circuitry of the host computer is configured to execute a host application, thereby providing the user data; and the UE comprises processing circuitry configured to execute a client application associated with the host application.

Embodiment 27: A method implemented in a communication system including a host computer, a base station, and a User Equipment, UE, the method comprising: at the host computer, providing user data; and at the host computer, initiating a transmission carrying the user data to the UE via a cellular network comprising the base station, wherein the base station performs any of the steps of any of the Group B embodiments.

Embodiment 28: The method of the previous embodiment, further comprising, at the base station, transmitting the user data.

Embodiment 29: The method of the previous 2 embodiments, wherein the user data is provided at the host computer by executing a host application, the method further comprising, at the UE, executing a client application associated with the host application.

Embodiment 30: A User Equipment, UE, configured to communicate with a base station, the UE comprising a radio interface and processing circuitry configured to perform the method of the previous 3 embodiments.

Embodiment 31: A communication system including a host computer comprising: processing circuitry configured to provide user data; and a communication interface configured to forward user data to a cellular network for transmission to a User Equipment, UE; wherein the UE comprises a radio interface and processing circuitry, the UE's components configured to perform any of the steps of any of the Group A embodiments.

Embodiment 32: The communication system of the previous embodiment, wherein the cellular network further includes a base station configured to communicate with the UE.

Embodiment 33: The communication system of the previous 2 embodiments, wherein: the processing circuitry of the host computer is configured to execute a host application, thereby providing the user data; and the UE's processing circuitry is configured to execute a client application associated with the host application.

Embodiment 34: A method implemented in a communication system including a host computer, a base station, and a User Equipment, UE, the method comprising: at the host computer, providing user data; and at the host computer, initiating a transmission carrying the user data to the UE via a cellular network comprising the base station, wherein the UE performs any of the steps of any of the Group A embodiments.

Embodiment 35: The method of the previous embodiment, further comprising at the UE, receiving the user data from the base station.

Embodiment 36: A communication system including a host computer comprising: communication interface configured to receive user data originating from a transmission from a User Equipment, UE, to a base station; wherein the UE comprises a radio interface and processing circuitry, the UE's processing circuitry configured to perform any of the steps of any of the Group A embodiments.

Embodiment 37: The communication system of the previous embodiment, further including the UE.

Embodiment 38: The communication system of the previous 2 embodiments, further including the base station, wherein the base station comprises a radio interface configured to communicate with the UE and a communication interface configured to forward to the host computer the user data carried by a transmission from the UE to the base station.

Embodiment 39: The communication system of the previous 3 embodiments, wherein: The processing circuitry of the host computer is configured to execute a host application; and the UE's processing circuitry is configured to execute a client application associated with the host application, thereby providing the user data.

Embodiment 40: The communication system of the previous 4 embodiments, wherein: The processing circuitry of the host computer is configured to execute a host application, thereby providing request data; and the UE's processing circuitry is configured to execute a client application associated with the host application, thereby providing the user data in response to the request data.

Embodiment 41: T method implemented in a communication system including a host computer, a base station, and a User Equipment, UE, the method comprising: at the host computer, receiving user data transmitted to the base station from the UE, wherein the UE performs any of the steps of any of the Group A embodiments.

Embodiment 42: The method of the previous embodiment, further comprising, at the UE, providing the user data to the base station.

Embodiment 43: The method of the previous 2 embodiments, further comprising: at the UE, executing a client application, thereby providing the user data to be transmitted; and at the host computer, executing a host application associated with the client application.

Embodiment 44: The method of the previous 3 embodiments, further comprising: at the UE, executing a client application; and at the UE, receiving input data to the client application, the input data being provided at the host computer by executing a host application associated with the client application; wherein the user data to be transmitted is provided by the client application in response to the input data.

Embodiment 45: A communication system including a host computer comprising a communication interface configured to receive user data originating from a transmission from a User Equipment, UE, to a base station, wherein the base station comprises a radio interface and processing circuitry, the base station's processing circuitry configured to perform any of the steps of any of the Group B embodiments.

Embodiment 46: The communication system of the previous embodiment further including the base station.

Embodiment 47: The communication system of the previous 2 embodiments, further including the UE, wherein the UE is configured to communicate with the base station.

Embodiment 48: The communication system of the previous 3 embodiments, wherein: the processing circuitry of the host computer is configured to execute a host application; and the UE is configured to execute a client application associated with the host application, thereby providing the user data to be received by the host computer.

Embodiment 49: A method implemented in a communication system including a host computer, a base station, and a User Equipment, UE, the method comprising: at the host computer, receiving, from the base station, user data originating from a transmission which the base station has received from the UE, wherein the UE performs any of the steps of any of the Group A embodiments.

Embodiment 50: The method of the previous embodiment, further comprising at the base station, receiving the user data from the UE.

Embodiment 51: The method of the previous 2 embodiments, further comprising at the base station, initiating a transmission of the received user data to the host computer.

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
5G Fifth Generation
5GC Fifth Generation Core
5GS Fifth Generation System
AMF Access and Mobility Management Function AP Access Point
AS Access Stratum
ASIC Application Specific Integrated Circuit
AUSF Authentication Server Function
CA Carrier Aggregation
CE Control Element
CN Core Network
CPU Central Processing Unit
DC Dual Connectivity
DRX Discontinuous Reception
DSP Digital Signal Processor
eNB Enhanced or Evolved Node B
EN-DC Evolved Universal Terrestrial Radio Access Network New Radio Dual Connectivity
eLTE Enhanced Long Term Evolution
EPC Evolved Packet Core
E-UTRA Evolved Universal Terrestrial Radio Access
E-UTRAN Evolved Universal Terrestrial Radio Access Network
FPGA Field Programmable Gate Array
gNB New Radio Base Station
HSS Home Subscriber Server
ID Identity
I-RNTI Inactive Radio Network Temporary Identifier
LTE Long Term Evolution
MAC Medium Access Control
MCG Master Cell Group
MeNB Master Enhanced or Evolved Node B
MME Mobility Management Entity
MR-DC Multi-Radio Dual Connectivity
ms Millisecond
MTC Machine Type Communication
NE New Radio Evolved Universal Terrestrial Radio Access
NEF Network Exposure Function
NGEN-DC Next Generation Dual Connectivity
NG-RAN Next Generation Radio Access Network
NR New Radio
NRF Network Repository Function
NSSF Network Slice Selection Function
OTT Over-the-Top
PCell Primary Cell
PCF Policy Control Function
PCI Physical Cell Identity
P-GW Packet Data Network Gateway
PSCell Primary Secondary Cell
RAM Random Access Memory
RAN Radio Access Network
RAT Radio Access Technology
ROM Read Only Memory
RRC Radio Resource Control
RRH Remote Radio Head
RRM Radio Resource Management
RSRP Reference Signal Received Power
RSRQ Reference Signal Received Quality
SA Stand-Alone
SCEF Service Capability Exposure Function
SCell Secondary Cell
SCG Secondary Cell Group
SIB System Information Block
SMF Session Management Function
SpCell Special Cell
S-TMSI System Architecture Evolution Temporary Mobile Subscriber Identity
TS Technical Specification
UDM Unified Data Management
UE User Equipment
UPF User Plane Function
WID Work Item Description Those skilled in the art will recognize improvements and modifications to the embodiments of the present disclosure. All such improvements and modifications are considered within the scope of the concepts disclosed herein.

What is claimed is:

1. A method performed by a wireless device, the method comprising:
   receiving a dormant state measurement configuration for a source Radio Access Technology, RAT, from a network node of the source RAT;
   performing measurements while in a first dormant state in accordance with the dormant state measurement configuration;
   performing an inter-RAT cell reselection from the source RAT to a target RAT while in the first dormant state; and
   upon performing the inter-RAT cell reselection from the source RAT to the target RAT while in the first dormant state,
   stopping a timer that limits an amount of time that the wireless device is to perform measurements in accordance with the dormant state measurement configuration for the source RAT;
   releasing the dormant state measurement configuration; and
   stopping performance of measurements made in accordance with the dormant state measurement configuration for the source RAT.

2. The method of claim 1 wherein the dormant state measurement configuration received from the network node comprises a dormant state measurement configuration for measuring on cells, frequencies, and/or beams associated with the source RAT.

3. The method of claim 2 wherein the dormant state measurement configuration received from the network node comprises a dormant state measurement configuration for measuring on cells, frequencies, and/or beams associated with the target RAT.

4. The method of claim 1 further comprising reporting the measurements to a target RAT network node.

5. A wireless device adapted to:
   receive a dormant state measurement configuration for a source Radio Access Technology, RAT, from a network node of the source RAT;
   perform measurements while in a first dormant state in accordance with the dormant state measurement configuration;
   perform an inter-RAT cell reselection from the source RAT to a target RAT while in the first dormant state; and
   upon performing the inter-RAT cell reselection from the source RAT to the target RAT while in the first dormant state,
   stop a timer that limits an amount of time that the wireless device is to perform measurements in accordance with the dormant state measurement configuration for the source RAT;
   release the dormant state measurement configuration; and
   stop performance of measurements made in accordance with the dormant state measurement configuration for the source RAT.

6. The wireless device of claim 5 wherein the dormant state measurement configuration received from the network node comprises a dormant state measurement configuration for measuring on cells, frequencies, and/or beams associated with the source RAT.

7. The wireless device of claim 6, wherein the dormant state measurement configuration received from the network node comprises a dormant state measurement configuration for measuring on cells, frequencies, and/or beams associated with the target RAT.

8. The wireless device of claim 5 wherein the wireless device is further adapted to report the measurements to a target RAT network node.

* * * * *